US008473446B2

(12) United States Patent
 Browne

(10) Patent No.: US 8,473,446 B2
(45) Date of Patent: Jun. 25, 2013

(54) METHOD AND APPARATUS FOR HYPOTHESIS TESTING

(75) Inventor: David Wellesley Browne, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 416 days.

(21) Appl. No.: 12/916,255

(22) Filed: Oct. 29, 2010

(65) Prior Publication Data
 US 2011/0270792 A1    Nov. 3, 2011

Related U.S. Application Data

(60) Provisional application No. 61/256,791, filed on Oct. 30, 2009.

(51) Int. Cl.
 *G06N 5/00*     (2006.01)
(52) U.S. Cl.
 USPC .......................................................... 706/48
(58) Field of Classification Search
 USPC .................................................... 706/48, 45
 See application file for complete search history.

(56) References Cited

PUBLICATIONS

Liang, et al., Decision Tree for Dynamic and Uncertain Data Streams, JMLR: Workshop and Conference Proceedings 13: 209-224, 2nd Asian Conference on Machine Learning (ACML2010), Tokyo, Japan, Nov. 8-10, 2010, pp. 209-224.*

Browne, D.W., "Detection of Unknown Signals in Unknown, Non-Stationary Noise," *Proceedings of the Asilomar Conference on Signals, Systems, and Communications*, Nov. 2009.
David, H.A., "Order Statistics", Wiley, 1981.
Gandhi, P.P. and Kassam, S.A., "Analysis of CFAR processors in nonhomogeneous background," *IEEE Trans. on Aerospace and Electronic Systems*, vol. 24, No. 4, Jul. 1988.
Guttman, I., "Statistical Tolerance Regions: Classical and Bayesian", Griffin, London, 1970.
Real, E.C. and Tufts, D.W., "Estimation of Prescribed False Alarm Rate Thresholds from Local Data Using Tolerance Intervals", IEEE Signal Processing Letters, vol. 6, No. 1, Jan. 1999.
Sarma, A. and Tufts, D.W., "Robust Adaptive Threshold for Control of False Alarms", IEEE Signal Processing Letters, vol. 8, No. 9, pp. 261-263, Sep. 2001.
Sonnenschein, A. and Fishman, P., "Radiometric Detection of Spread Spectrum Signals in Noise of Uncertain Power," IEEE Tran. on Aerospace and Electronic Sys., vol. 28, No. 3, pp. 654-660, Jul. 1992.

(Continued)

*Primary Examiner* — Wilbert L Starks
(74) *Attorney, Agent, or Firm* — Hamilton, Brook, Smith & Reynolds, P.C.

(57) ABSTRACT

A decision stream in a hypothesis testing problem may be obtained by comparing a received data stream to a threshold. The threshold may be generated from a noise subset of the data stream based on certain characteristics of observed data. The probability distribution of the noise subset along with characteristics of the data stream may be used in determining the threshold. The determination of the threshold may be adaptive to maintain a user prescribed probability of error. A decision state machine may be used to control the manner in which noise characteristics are used to guide the hypothesis testing, increase the detection rate, and reduce the probability of error. The decision state machine evaluates the decision stream to determine falsely classified data samples and reclassify such items appropriately. The decision state machine may filter the decision stream to ensure that a lower decision error rate is achieved.

44 Claims, 17 Drawing Sheets

PUBLICATIONS

Urkowitz, H., "Energy Detection of Unknown Deterministic Signals," Proceedings of the IEEE, vol. 55, No. 4, pp. 523-531, Apr. 1967.

Wilks, S.S., "Determination of Sample Sizes for Setting Tolerance Limits", The Annals of Mathematical Statistics, vol. 12, No. 1, pp. 91-96, Mar. 1941.

Zoubir, A.M. and Breich, R.F., "Tolerance Intervals for Accuracy Control of Bootstrapped Matched Filters," IEEE Signal Processing Letters, vol. 9, No. 8, pp. 247-250, Aug. 2002.

Barkat, M. et al., "CFAR Detection for Multiple Target Situations", IEE Proceedings-F. Communications, Radar & Signal Processing, Institution of Electrical Engineers, 136(5): 193-209 (Oct. 1, 1989).

Bath, W.G., and Trunk G.V., "Chapter 7: Automatic Detection, Tracking and Sensor Integration" In Merril Skolnik: *Radar Handbook, 3rd Ed.*, Skolnik, M. ed. (NY: Mcgraw-Hill) pp. 7.1-7.57, 7.7, 7.17-7.18 (Jan. 1, 2008).

Himonas, S.D., "A Robust Automatic Censored CFAR Detector for Nonhomogeneous Environments", Proceedings of the National Radar Conference, Los Angeles, CA and N.Y, NY, (5): 117-121, (Mar. 12, 1992).

International Search Report and The Written Opinion mailed Dec. 28, 2011 of International Application No. PCT/US2010/054840, International Filing Date: Oct. 29, 2010.

Varshney, Pramod K., "Distributed Detection and Data Fusion" (N.Y.: Springer-Verlag New York, Inc.) pp. 30-32 and 139-152 (Jan. 1, 1997).

* cited by examiner

| Decision State $S_j$ | Decision Sequence $[\delta_{i-2}\ \delta_{i-1}\ \delta_i]$ | Extraction State $\Omega_k$ | Decision State Probability $P(S_j)$ | $P(S_j|\Omega_k)$ |
|---|---|---|---|---|
| 510 — $S_0$ | [000] | E | $(1-\alpha)^3$ | $(1-\alpha)^2$ |
| 520 — $S_1$ | [001] | D | $\alpha(1-\alpha)^2$ | $1-\alpha$ |
| 530 — $S_2$ | [010] | E | $\alpha(1-\alpha)^2$ | $\alpha(1-\alpha)$ |
| 540 — $S_3$ | [011] | R | $\alpha^2(1-\alpha)$ | $1-\alpha$ |
| 550 — $S_4$ | [100] | E | $\alpha(1-\alpha)^2$ | $\alpha(1-\alpha)$ |
| 560 — $S_5$ | [101] | D | $\alpha^2(1-\alpha)$ | $\alpha$ |
| 570 — $S_6$ | [110] | E | $\alpha^2(1-\alpha)$ | $\alpha^2$ |
| 580 — $S_7$ | [111] | R | $\alpha^3$ | $\alpha$ |

FIG. 5D

| Extraction State $\Omega_k$ | Extraction State Probability $P(\Omega_k)$ | $P(\Omega_k)|_{\alpha=0.05}$ |
|---|---|---|
| E | $1-\alpha$ | 0.95 |
| R | $\alpha^2$ | 0.0025 |
| D | $\alpha(1-\alpha)$ | 0.0475 |

FIG. 5E

METHOD AND APPARATUS FOR HYPOTHESIS TESTING

RELATED APPLICATION

This application claims the benefit of U.S. Provisional Application No. 61/256,791, filed on Oct. 30, 2009, the entire teachings of which are incorporated herein by reference.

GOVERNMENT SUPPORT

This invention was made with government support under Air Force Contract FA8721-050-C-0002 awarded by the U.S. Air Force. The government has certain rights in the invention.

BACKGROUND

In most estimation and detection problems, one or more parameters describing an underlying physical process must be estimated from measured or empirical data. For example, in remote sensing applications, the goal of estimation is to obtain some information about the underlying structure of subsurface anomalies (e.g., land mines, tumors, etc.) by analyzing data obtained from a sensor. Most estimation problems assume that the data are random and have a probability distribution dependent on the parameters of interest. The data are also often assumed to include noise.

In most detection problems, the goal of detection is to discern, under conditions of uncertainty, whether or not a signal of interest exists in data by making decisions. In such problems a threshold test is often employed to partition data believed to contain the signal of interest from data believed to contain only noise.

Detection problems can be described as a hypothesis test in which two types of misclassification errors are possible: false positive decision (i.e., false alarm) and false negative decision. A false positive decision can be made when a null hypothesis is incorrectly rejected despite being true. A false negative decision occurs when a null hypothesis is not rejected despite its being false. This may be generalized to hypothesis testing (i.e., classification problems) in which misclassification errors are also possible and are characterized by a confusion matrix. In the generalization to hypothesis testing, thresholds are generalized to decision boundaries and similar tradeoffs extend to the associated misclassification rates.

Most detection problems require that a threshold be determined prior to making a decision. Based on the determined threshold, any data value greater than the threshold is considered to include the signal of interest and any data value falling below the threshold level is considered to be noise and/or clutter. If this threshold is lowered, then the detection rate will increase and the number of false alarms will also increase. Lower false alarm rates may be achieved by increasing the threshold levels but this will result in a decreased detection rate.

In the simplest detection problems, the noise and/or clutter statistics are taken as a priori information so that the test threshold may be computed in advance to achieve a desired false alarm rate. However, since complete knowledge of noise statistics is not typically possible (as this would require clairvoyance), noise or clutter statistics must be modeled and model parameters must be estimated [7]. In such cases, Constant False Alarm Rate (CFAR) detection techniques may be used to determine threshold levels that ensure a prescribed false alarm rate. For example, some CFAR techniques may adaptively change the threshold levels in accordance with the changing statistics of the background noise or clutter in which the signals are to be detected [8]. However, most CFAR techniques still make some assumption about the noise model or the parameters thereof to ensure the prescribed performance level is achieved.

Distribution-Free Tolerance Intervals (DFTI) [3]-[5] may be used to formulate tests that are not reliant on assumptions of noise and/or clutter model or parameters thereof [1], [2]. For example, detectors employing DFTI may have constant false alarm rates (CFAR) at a prescribed level, a, regardless of the statistics of their background noise. Such detectors are, therefore, robust to the model and parameter uncertainty to which commonly used detectors are sensitive [6].

SUMMARY

Certain embodiments of the present invention relate to a method and corresponding apparatus for hypothesis testing. For example, in some embodiments, a received data stream is compared to a threshold, the outcome of which is a decision stream. A noise subset of the data stream may be determined based on recent decisions in the decision stream, and the threshold may be generated based on an order statistics processing of the noise subset.

Some embodiments perform hypothesis testing by receiving a data stream, receiving a decision stream based on the data stream, comparing the received data stream to a threshold, determining a noise subset of the data stream based on a pattern of recent decisions in the decision stream, and determining the threshold from noise subset.

Certain embodiments may perform hypothesis testing by receiving a data stream, determining a decision stream based on the data stream compared to a threshold, and determining a noise subset of the data stream based on the decision stream. The embodiments may generate the threshold from the noise subset of the data stream and modify the decision stream based on patterns of recent decisions in the decision stream.

Some embodiments may perform hypothesis testing by receiving a data stream and determining a decision stream based on the data stream compared to a threshold. The embodiments may modify the decision stream based on a pattern of recent decisions in the decision stream.

Certain embodiments perform hypothesis testing by receiving a data stream and determining a noise subset of the data stream. The embodiments identify a maximum element from each of plural portions of the noise subset, select one of the identified maximum elements to generate a threshold, and obtain a decision stream based on the data stream compared to the threshold.

In certain embodiments the noise subset may be determined based on a pattern of recent decisions in the decision stream. The embodiments may modify the decision stream based on the pattern of recent decisions.

Certain embodiments may generate the threshold by identifying a maximum element from each of plural portions of the noise subset and selecting one of the identified maximum elements to generate the threshold. In certain embodiments, the threshold may be generated based on a median value of the identified maximum values.

In some embodiments, the threshold may be generated by identifying a maximum element from each of plural portions of the noise subset and selecting one of the identified maximum elements to generate the threshold. Certain embodiments may obtain the threshold based on a median value of the identified maximum values. In some embodiments, the threshold may be generated by selecting an element of the noise subset.

The data processor may include at least one of a field-programmable gate array circuit, a digital signal processor (DSP), an application specific integrated circuit (ASIC), a graphics processing unit (GPU), or a central processing unit (CPU).

Certain embodiments may adaptively update at least one of the decision stream and the threshold to achieve a constant probability of false alarm.

In certain embodiments the threshold may be determined based on a user-prescribed probability of error.

Some embodiment may determine the threshold based on a maximum order statistics identified from the order statistics processing of the noise subset. Certain embodiment may determine the threshold based on characteristics of the data stream. The characteristics of the data stream may include power of the data stream. In certain embodiments, the threshold may be obtained based on characteristics obtained from an order statistics processing of the data stream. Certain embodiments may divide the data stream into plural portions and identify a maximum value of each plural portion. A threshold may be obtained based on a median value of the identified maximum values. Further, in certain embodiments, the decision stream may by multi-hypothesis testing of the data stream compared to multiple thresholds.

Certain embodiments may process the decision stream using decision logic by filtering decision stream samples having a higher probability of false alarms.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5D is a table that summarizes the extraction state and decision state probabilities of the decision states shown in FIGS. 5A-5C.

FIG. 5E is a table that illustrates the probability of being in each extraction policy state shown in FIG. 5D.

DETAILED DESCRIPTION

A description of example embodiments of the invention follows.

Figure 1A:
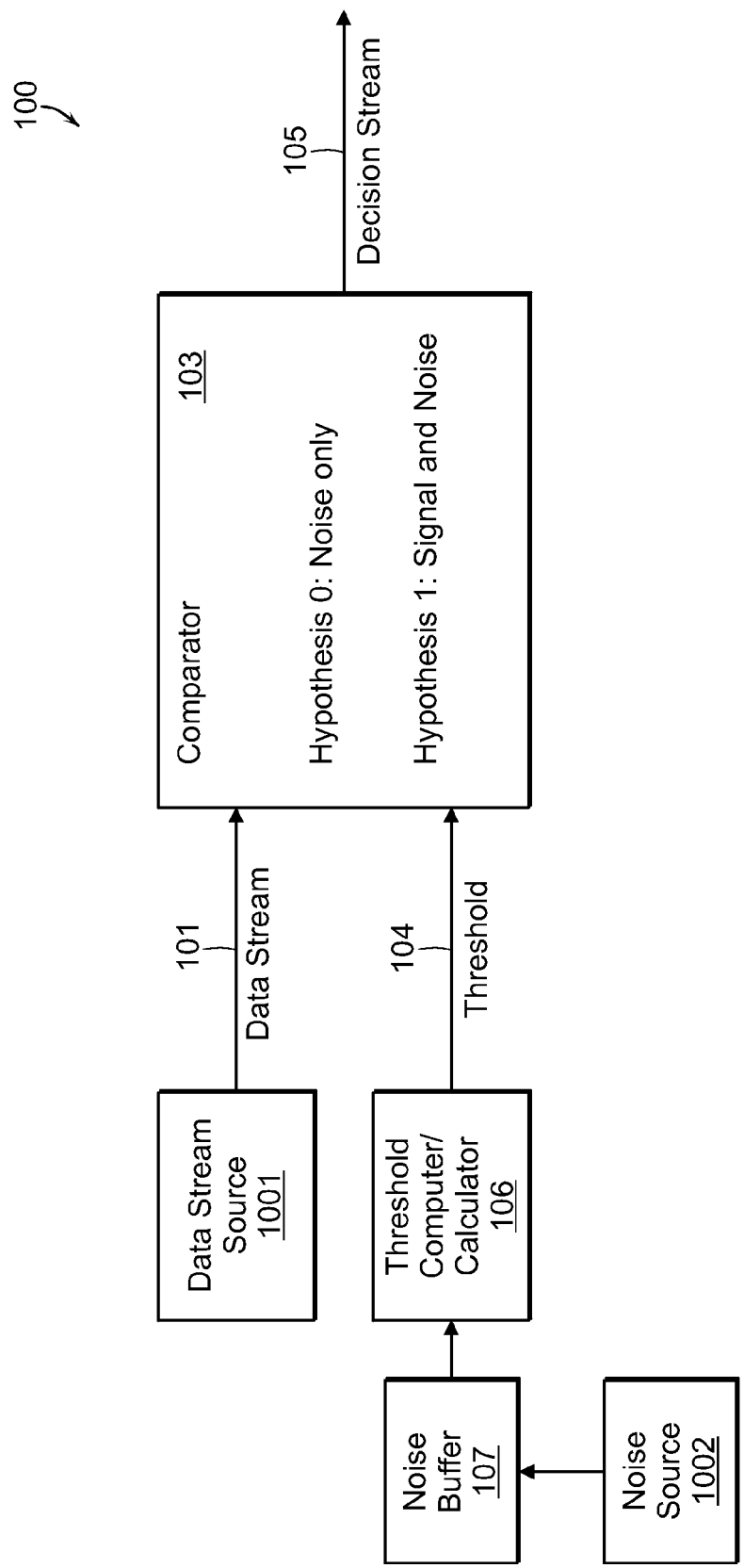
FIG. 1A is a high-level illustration of some embodiments that use a threshold for a statistical hypothesis test.

FIG. 1A is a high-level illustration of some embodiments that use a threshold 104 and comparator 103. The embodiments perform a statistical hypothesis test on a data stream 101 to produce a decision stream 105 that indicates the occurrence of an anomalous event in the source 1001 generating the data stream 101. For example, embodiments may be able to analyze signals received from a remote object (e.g., radiations from an anomaly in a computed tomography system, etc.) to obtain a decision stream 105 that indicates whether the observed data stream 101 contains information regarding the anomalous event (i.e., signal+noise) or whether the received data contains nominal information (i.e., noise only).

Embodiments of the present invention may be used in various applications such as detection of anomalous regions in medical images (e.g., computer tomography, magnetic resonance imaging) or for detection of anomalous events in monitoring a patient's vitals. Other possible applications include radio communication (e.g., radio signal detection, spectrum sensing for agile radios and cognitive radios, automatic gain control, determination of decision boundaries for digital modulation), sensor and sonar (e.g., target detection), financial applications (e.g., detecting anomalous events in multimodal monitoring of financial processes), and data thinning for further analysis (e.g., search for life).

Further, embodiments of the invention may be applied to a broad array of technologies involving signal detection. For example, embodiments of the invention may be used in image processing, radio communications, radio astronomy, radar, sonar, biological signals analysis, biological gene expression, financial services, climate monitoring, seismology, and manufacturing quality control. In some of these applications, further processing of the data stream may then be dependent on the decision stream. In medical image processing, for example, a noise portion of the data stream may be discarded and further image processing may be executed on data determined to be anomalous by the hypothesis test. Embodiments of the present invention may be applied in data thinning applications where a data stream is reduced to only those data that are considered to have information regarding an event or signal of interest.

In order to make such analysis, certain embodiments use the following hypotheses:

Hypothesis 0: observed data stream only includes noise, and

Hypothesis 1: observed data stream includes both signal and noise.

Embodiments of the present invention are not limited to the binary hypothesis testing as presented above. Certain embodiments may perform hypothesis testing (i.e., Hypothesis 0, Hypothesis 1, . . . , Hypothesis n, where n can be any finite positive integer) using a plurality of thresholds derived according the methods claimed in the invention.

Existing hypothesis testing methods often assume that some information regarding statistical distribution of the observed data stream 101 is available (i.e., distributions of signal and/or noise are available). However, embodiments of the present invention do not assume that any information regarding the statistical distributions of signal and/or noise is available.

In order to perform hypothesis testing (i.e., making a decision between hypothesis 0 and hypothesis 1 in the above example), certain embodiments may employ a threshold 104 that may be computed by a threshold computer 106. In certain embodiments, the threshold 104 may be selected based on certain characteristics of the data, such as the magnitude of the data. Accordingly, if the magnitude of the observed data is greater than or equal to the threshold, hypothesis 1 is decided to be true. Otherwise, hypothesis 0 is decided to be true.

The value of the threshold 104 may be determined prior to each decision. In certain embodiments, the threshold 104 may be of a stochastic nature. In certain embodiments, the value of threshold 104 may be changed with time as a function of current and past values of data 101.

The data stream 101 may be the outcome of having performed some mathematical or physical operation on data generated by the data source 1001. Each datum in the data stream may then be said to be a test statistic that may then be used in making a decision using the hypothesis testing method of the present invention. For example, in certain embodiments, the power (squared magnitude) of a complex-valued datum generated from the data source 1001 may be used as the test statistic in the subsequent hypothesis test to obtain a decision regarding presence of a signal in the data source 1001.

In certain embodiments, multiple datum points obtained from the data source 1001 may be used to produce a single test statistic for hypothesis testing. In this way, the detection probability may be improved as the number of observations increases. Some embodiments of the present invention may employ only a single datum and thereby achieve a low-latency hypothesis test by way of producing a decision for each datum in the data stream as it becomes available and doing so before the next datum is available.

The data stream may be used to estimate the cumulative distribution function of the noise in the data stream. Certain embodiments may assume that a set of noise-only data streams are available and use these sets to estimate the cumulative distribution function of the noise.

In certain embodiments, the cumulative distribution function of noise along with characteristics of the data stream (e.g., order statistics of the data stream) may be used in determining the threshold 104.

The term "order statistics" refers to a finite sized subset of data derived from the data stream that has been sorted in ascending order. Certain embodiments may select the sample with rank p ($p^{th}$ smallest) of the order statistics set of size N (referred to herein as "order statistic threshold") as a threshold 104. Certain embodiments may instead use a selection algorithm to select the $p^{th}$ smallest element from a finite sized unordered subset of data derived from the data stream as the threshold. This produces and equivalent threshold to embodiments using a sorting of the same data subset followed by selecting the $p^{th}$ sample from the order statistics set. The difference is that the selection algorithm may achieve it's equivalent result with lower computational complexity than the sort-and-select algorithm used to generate the order statistics set. Certain embodiments may use either the selection or sort-and-select algorithms described above to select the $q^{th}$ largest element of a finite sized subset of data derived from the data stream as the threshold.

The parameters p and N may be obtained using various methods such as through determining coverage (described later with relation to Equation (9)) or using a tolerance interval method (described later with relation to Equation (12)) or using embodiments employing decision filtering (described later with relation to Equation (21)).

The threshold to be used in testing the hypothesis may be computed from a sequence of data 1002 that is considered to be noise only. In known prior systems, that noise source may itself be derived from the original data stream. In certain embodiments, the threshold computer 106 may employ past noise only data of the noise subset 107 to determine the threshold 104 as explained with reference to FIG. 1B. In some embodiments, the threshold 104 may be obtained using noise information 107 obtained from a noise source (e.g., a genie noise source).

Figure 1B:
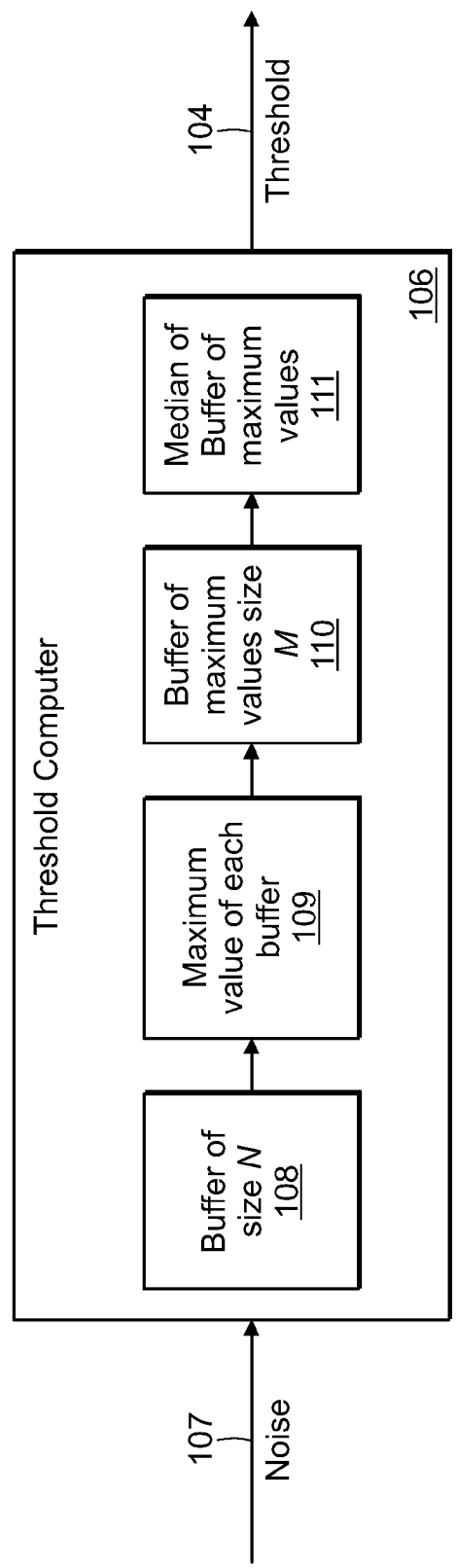
FIG. 1B is a high-level illustration of an embodiment of the threshold computer shown in FIG. 1A.

FIG. 1B is a high-level illustration of an embodiment of the threshold computer 106 shown in FIG. 1A. The computer 106 may be used to process noise derived from known techniques or, preferably from the novel technique described below. The threshold computer 104 may arrange the realizations of the noise subset 107 of the data stream 101 in buffer sizes of N data samples 108. The example embodiment determines at 109 the maximum value of the data points in each buffer 108. The obtained maximum values may be stored in a buffer 110 of size M. A median value 111 of the maximum values stored in the buffer 110 of size M may be obtained. This median value 111 may be used as a threshold 104 for obtaining a decision stream 105. The median computation itself may be performed from sequence of maximum determinations, thus enabling use of the same circuitry as for the maximum 109.

The threshold computer can be seen as an order statistics process comprising the cascade of two order statistics processes without the need to perform a sort operation. The maximum operation selects what would be the final sample after a sort operation but requires only a simple sequence of comparisons. The median operation that identifies the middle sample after a sort can instead be performed by sequentially identifying and removing maximums from the test set through half of the test set. By first performing the max operations, the data set to be processed by the median operation is generally reduced. Overall, the cascaded process enables implementation of the present invention in in digital processing hardware having limited memory capacity.

Figure 1C:
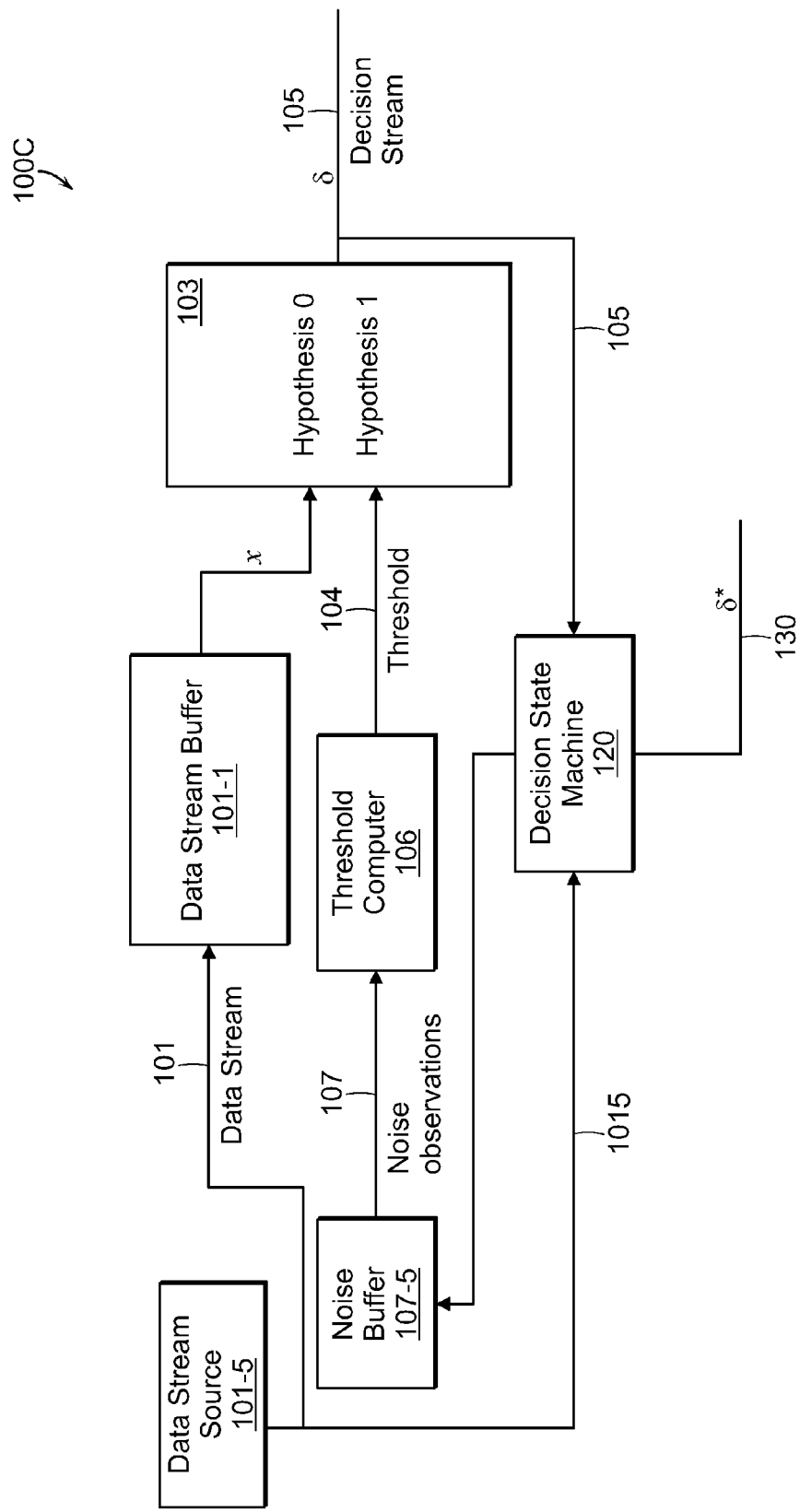
FIG. 1C illustrates functional structure of a configuration for detecting a signal.

FIG. 1C illustrates functional structure of a configuration for detecting a signal in noisy data according to certain embodiments. As explained above, a single observation at a time 101-1 of a data stream 101 may be employed in the hypothesis testing problem. The data stream 101 may be provided by a data stream source 101-S. The data stream source may be any source that provides the data, for example, a tomographic sensor providing data obtained from a remote object.

As explained with reference to FIG. 1B, a threshold computer 106 may determine a threshold 104 based on noise observations 107 obtained from a noise source 107-S. In certain embodiments, the noise source may be derived from past observations of noise in the data stream.

A decision state machine 120 may be used to control the manner in which the noise buffer 107-S is populated with noise data from the data stream 101. In certain embodiments, the decision state machine 120 employs a memory and a logic having a finite number of states to enforce a policy for updating the noise buffer 107-S using recent decisions in the decision stream 105. In some embodiments, the decision state machine 120 employs a memory and a logic that is used to correct errors in the decision stream 105 and output this corrected decision stream 130.

Figure 1D:
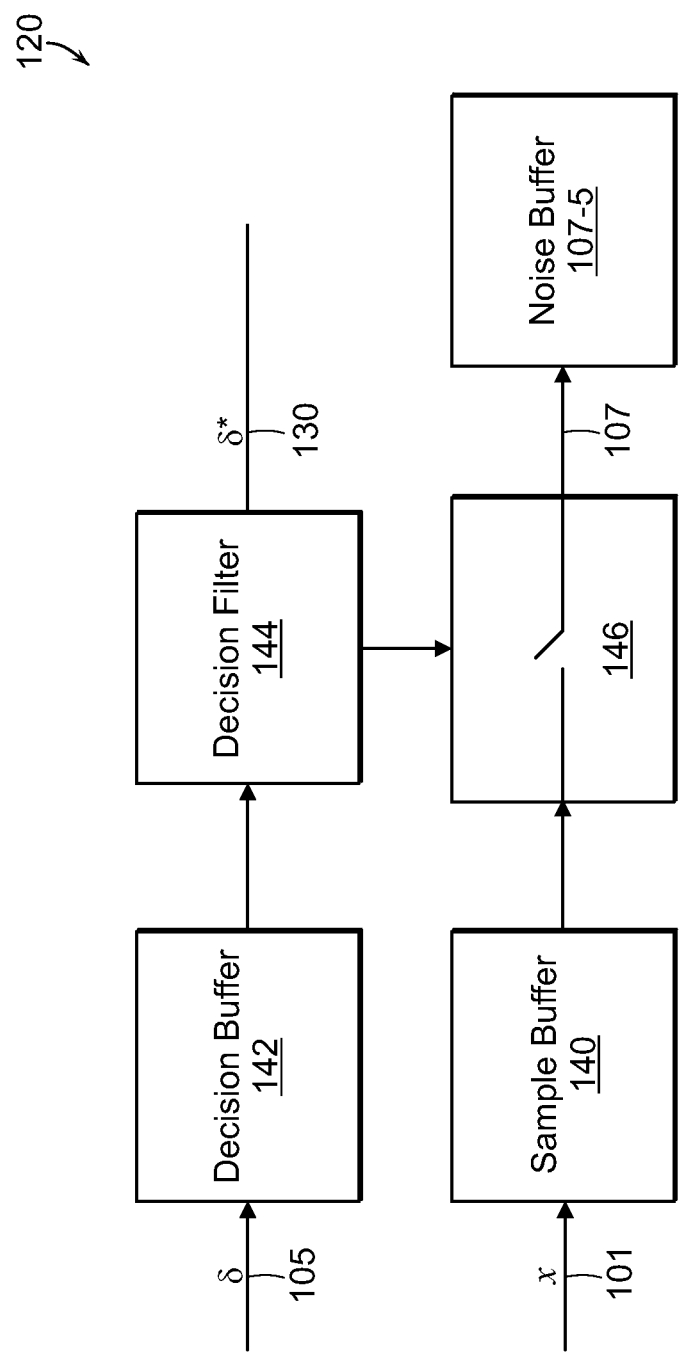
FIG. 1D illustrates a decision state machine embodying certain aspects of the invention in high-level.

FIG. 1D illustrates a decision state machine in accordance with the present invention. As already illustrated in FIG. 1C, the state machine 120 receives the data stream x 101 as well as the decision stream δ 105. Subsets of each stream are buffered in respective buffers 140 and 142. Only those data samples that are considered to be noise are passed to the noise buffer 107-s for computation of the threshold in FIG. 1C. To that end, one might simply pass a data sample 101-1 for which the hypothesis test 103 determined it to be noise only. However, in accordance with one aspect of the present invention, the decision of whether to pass a sample as noise is based not only on the corresponding decision, but on a pattern of decisions including the corresponding decision, and/or recent past decisions, and/or future decisions. For example, knowledge of the signal might determine that the signal is unlikely to occur in a single data sample that is isolated from of other occurrences in the immediate neighboring data samples. The decision pattern of this unlikely isolated occurrence may be encoded [010] in the decision stream 105 where the middle symbol is an isolated alarm. Accordingly, the Decision Analyzer and Filter 144 may recognize this decision pattern of [010] and as indication that the alarm was in error and that the data sample corresponding to the alarm should be designated as noise. The Decision Analyzer and Filter 144 might then determine that the sample corresponding to the isolated alarm should be passed from the Sample Buffer 140 via the controlled path 146 to the noise buffer 107-S. Furthermore, the Decision Analyzer and Filter 144 may determine that this [010] sequence of decisions in the decision stream 105 should be corrected to [000] and provided at the output δ* decision stream 130. The decisions δ* in the decision stream 130 may otherwise be the same as the decisions δ in the decision stream 105. The decision stream 130 might be considered to be more accurate than the decision stream 105 and thus more useful in a system where any latency incurred in generating the decision stream 130 can be tolerated. A more detailed description of an embodiment of a perpetual state machine is presented below.

In the example given, only three decisions in the pattern need be observed. These three decisions define eight possible states. Each state would determine whether a corresponding sample of the data stream $x_i$ should be passed to the noise buffer, potentially converting zeros to ones as well as ones to zeros. Longer patterns might be considered to define more states and allow for more complex decisions.

The performance of the hypothesis testing is robust to uncertainty relating to statistical characteristics of the data and is adaptive for statistically non-stationary data. Certain embodiments may use a user-prescribed probability of false alarm in determining a true hypothesis. Specifically, the parameters for computing the threshold may be selected to ensure that the user-prescribed probability of error is achieved. In certain embodiments, a minimum dataset size required for achieving the user-prescribed probability of error may further be determined.

Some embodiments may further adaptively update a reference dataset from which the threshold for the statistical hypothesis test is computed.

Embodiments of the present invention may provide a test threshold with significantly lower variance than currently available in the art, allowing the hypothesis testing to achieve better sensitivity than previously possible. The sensitivity achieved by certain embodiments may in fact be close to that of an ideal threshold on an optimal non-parametric test.

Further, embodiments of the present invention provide low latency test result with dramatically lower probability of error than available in the art. Certain embodiments may use significantly fewer memory and logic elements in a hardware implementation than previously required for achieving similar performance levels.

Most available methods in the, art require using multiple thresholds to detect start and end of a signal. Certain embodiments overcome these difficulties by indicating the presence of a signal using a combination of a single threshold and the state machine logic, thereby reducing computational complexity.

Figure 1E:
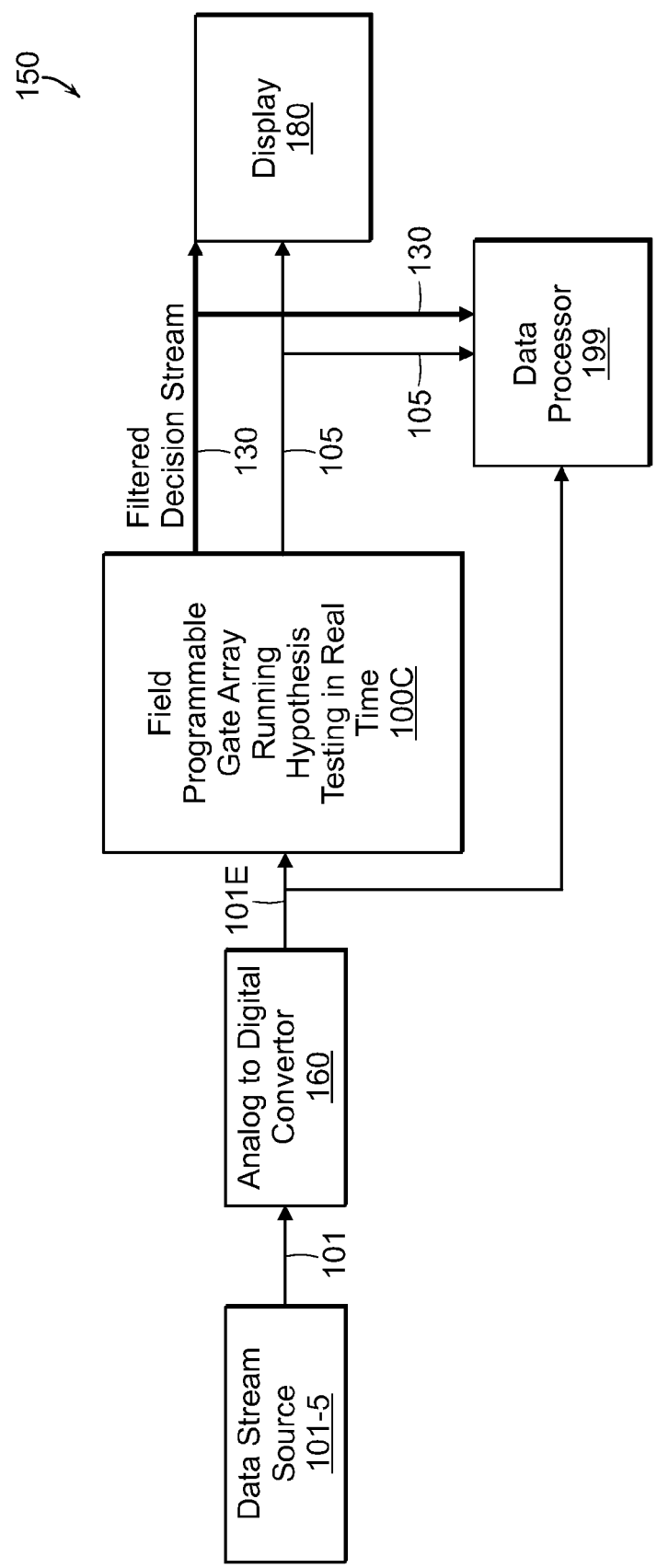
FIG. 1E is a high-level block diagram of a possible hardware implementation of an embodiment.

FIG. 1E is a high-level block diagram 150 of a possible hardware implementation of an embodiment. As explained above, a data stream source 101-S may provide a data stream 101 for hypothesis testing. The data stream 101 is passed to an analog to digital convertor 160 that converts the data from analog to corresponding digital samples 101-E. The digital samples 101-E may be processed using a data processor 100C, in this case a field programmable gate array, to run the procedures involved in hypothesis testing in real time (as explained in relation to FIGS. 1A-1C) and provide decision streams 105 and 130. The decision streams 105, 130 may be displayed on a display 180 (e.g., a computer monitor). More significantly, the decision streams may control further processing of the initial data stream in a data processor 199.

Figure 1F:
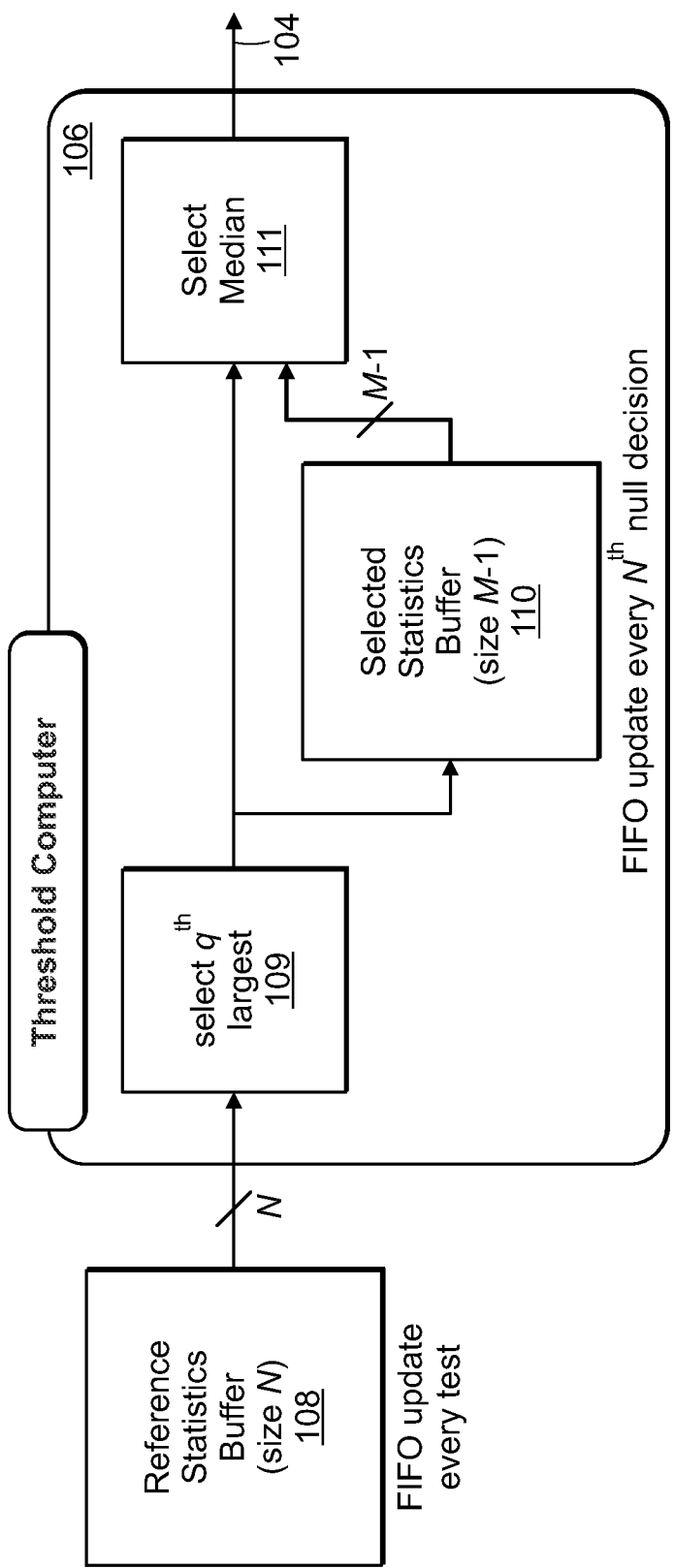
FIG. 1F is an illustration of an embodiment of an efficient threshold computer shown in FIGS. 1A and 1B.

FIG. 1F is an illustration of an embodiment of an efficient threshold computer shown in FIGS. 1A and 1B. As shown in this figure, in certain embodiments, the threshold computer 106 may be used to process noise. The threshold computer 106 arranges the realizations of the noise subset 107 of the data stream 101 in buffer sizes of N data samples 108. The example embodiment determines the maximum value 109 of the data points in each buffer 108. The obtained maximum values may be stored in a buffer 110 of size M, with M<<N. A median value 111 of the maximum values stored in the buffer 110 of size M may be obtained. This median value 111 may be used as a threshold 104 for obtaining a decision stream 105. The median computation itself may be performed as a sequence of m/2 maximum determinations, thus enabling use of the same circuitry as for the maximum 109. The embodiment shown in FIG. 1E can achieve a median-of-maximums estimator (MOME) threshold using N+M+1 elements.

Formulation of Statistical Framework of Some Embodiments

A discrete random process generates a time-series of observations, each composed of either noise, $W_i \in C$, or noise and an additive signal component, $S_i \in C$, where C is the set of complex scalars. The two possible characterizations of the $i^{th}$ observation are $$H_0: Y_i = W_i$$

$$H_1: Y_i = S_i + W_i. \quad (1)$$

The noise component is independent and identically distributed (i.i.d.) over the index i as is the signal component. The noise and signal are independent of each other and no a priori information on the statistical distribution of $Y_i$ is assumed. In certain applications, the signal is not typically present (i.e., $Pr(H_0) \gg Pr(H_1)$) and, when present, is uninterrupted within a finite window whose duration is random with unknown distribution. A binary decision, $\delta_i \in \{0, 1\}$, may be made for each observation with minimal latency (i.e., by time i+1). It is desired that the detector have a constant probability of false alarm (CFAR) that does not exceed some prescribed level, α. Further, the probability of detection, $P_D$, must be simultaneously maximized. A distinction that may be leveraged in the testing the hypotheses of (1) is that the energy of $Y_i|H_0$ is stochastically greater than that of $Y_i|H_1$. That is, for the test statistic $X_i = |Y_i|^2$, the condition $$F_X(\chi|H_1) \leq F_X(\chi|H_0) \quad (2)$$

holds for all distributions of $Y_i$. A decision rule for testing $X_i$ against threshold γ is $$\delta_i = \begin{cases} 1 & \text{if } x_i \geq \gamma \\ 0 & \text{if } x_i < \gamma \end{cases} \quad (3)$$

Given a stochastic threshold with density function $f_\Gamma(\gamma_i)$, the probability of false alarm and probability of detection of the test are $$P_F = \int_{R_\Gamma} f_\Gamma(\gamma) \left[ \int_\gamma^\infty f_X(x|H_0) dx \right] d\gamma \quad (4)$$

$$P_D = \int_{R_\Gamma} f_\Gamma(\gamma) \left[ \int_\gamma^\infty f_X(x|H_1) dx \right] d\gamma \quad (5)$$

The test statistic of the energy detector may be computed as $$X = (1/L) \sum_{i=1}^{L} |Y_i|^2,$$

where the divergence between $F_X(\chi|H_1)$ and $F_X(\chi|H_0)$ increases without bound as $L \rightarrow \infty$ [7]. The signal to noise ratio (SNR) of the test statistic is defined as $$\theta_L = \varepsilon\left\{\sum_{i=1}^{L} |S_i|^2\right\} / \varepsilon\left\{\sum_{i=1}^{L} |W_i|^2\right\}$$

and is a suitable measure of divergence under the model in (1). A closed-form expression relating the parameters $\{\gamma, L, \theta, P_F, P_D\}$ may be derived by invoking the central limit theorem or by leveraging a priori knowledge of the distributions of $Y_i$ [6]. Consequently, the $P_F$ and $P_D$ of the energy detector can be improved to any prescribed levels given sufficient integration. This is difficult to realize with certainty in the case at hand for several reasons. First, the statistics of $Y_i$ are unknown and the signal's duration (an unknown feature) may not justify invoking the central limit theorem. Second, a priori knowledge of the signal duty cycle or duration is required for selecting the start and extent of the integration window. Third, the integration period may induce intolerable latency in declaring detection. For these reasons, certain embodiments set L=1 to avoid making further assumptions about the statistics and features of $Y_i$ and to constrain the problem space to low latency tests. The analysis in the sequel focuses on cases where $\theta_1 > 1$ as this is the SNR region in which energy detection has appreciable sensitivity.

Order Statistic Thresholds

Certain embodiments require the test threshold satisfy a distribution-free constant false alarm rate (CFAR) criterion given as $$P_F = \alpha, \text{ for all } F_X(\chi|H_0). \quad (6)$$

In an event $F_{X(\chi|H_0)}$ is known a priori, a optimal threshold $\gamma_\alpha$ satisfying equation (6) may be determined using well established methods. In the present case where $F_X(\chi|H_0)$ is unknown, $F_X(\chi|H_0)$ and threshold $\gamma_\alpha$ may rather be estimated empirically using order statistics (OS). Specifically, certain embodiments may assume that a set of N i.i.d noise reference statistics, $\{X_i|H_0\}_N$, is available from a noise source. The order statistics of $\{X_i|H_0\}_N$ comprise the set of random variables $\{X_{(r)}|H_0\}_N$ with elements ordered as $\chi_{(1)} < \chi_{(2)} < \ldots < \chi_{(N)}$. The set $\{X_{(r)}|H_0\}_N$ may serve as the basis for an empirical estimate of the unknown $F_X(\chi|H_0)$. The stochastic threshold $\Gamma = X_{(p)}$ may be selected from $\{X_{(r)}|H_0\}_N$ as the empirical estimate of $\gamma_\alpha$. This threshold is generally referred to hereinafter as an "order statistic" (OS) threshold and its distribution is a function of the unknown $F_X(\chi)$ [4].

As shown in [3], the teachings of which are incorporated by reference in its entirety, the coverage of X by the one-sided interval $[X_{(p)}, \infty)$ is $$C = \int_{X_p}^\infty f_X(x) dx, \quad (7)$$

The coverage, C, is beta distributed and its probability distribution is the regularized incomplete beta function, $\Gamma_\chi(a, b)$, with integer-valued parameters $a = N - p + 1$ and $b = p$. Therefore, the distribution and mean of the coverage may be given as:

$$F_C(c) = \sum_{k=N-p+1}^{N} \binom{N}{k} c^k (1-c)^{N-k}, \quad (8)$$

$$\mu_c = \frac{N-p+1}{N+1}. \quad (9)$$

The results of (8) and (9) are remarkable because they are free of the unknown distribution of X. A consequence of (8) and (9) is that an OS threshold achieves CFAR behavior regardless of the (unknown) distribution of $F_X(\chi|H_0)$ because it is the lower bound of a tolerance interval (DFTI) that has distribution-free coverage. Furthermore, these results show that an the OS threshold may have it's parameters $\{p, N\}$ chosen via analytic methods to achieve some prescribed coverage and, by implication, a prescribed CFAR level α.

Embodiments may employ various methods relying on the above properties of an OS threshold to choose parameters $\{p, N\}$ satisfying the conditions of (6). For example, certain embodiments may choose $\{p, N\}$ to satisfy (6) based on the observation that (7) is the inner integral of (4) and set mean coverage and probability of false alarm to be equivalent [1]. In such case, $\{p, N\}$ and α are related via $$\alpha \geq \frac{N-p+1}{N+1}. \quad (10)$$

This expression is free of the distribution of X and its use in choosing $\{p, N\}$ will result in what is hereinafter referred to as "Coverage Assured Order Statistics" (CAOS) threshold.

Some embodiments may choose $\{p, N\}$ by requiring a tolerance interval [2]-[3]. When $[X_{(p)}, \infty)$ is the one-sided tolerance interval with coverage of at most $\alpha \in [0,1]$ and tolerance of at least $\beta \in [0,1]$:

$$\Pr[C \leq \alpha] \geq \beta, \quad (11)$$

where the operator Pr[.] denotes probability. Since Pr[C≤α]=Fc(α), equation (11) may be rewritten as:

$$\sum_{k=N-p+1}^{N}\binom{N}{k}\alpha^k(1-\alpha)^{N-k}\geq 3. \qquad (12)$$

This expressing is also free of the distribution of X and its use in choosing {p, N} will result in what is hereinafter referred to as "Tolerance Assured Order Statistic" (TAOS) threshold.

Available techniques in the art [10] require the use of a class of algorithms called sorting algorithms to compute $X_{(p)}$ by first computing the ordered set $\{X_{(r)}|H_0\}_N$ from an unordered set $\{X_i|H_0\}_N$. In contrast, some embodiments of the present invention employ a class of lower complexity algorithms called selection algorithms to compute $X_{(p)}$ directly from an unordered set $\{X_i|H_0\}_N$. In the some embodiments, the computational complexity of an OS threshold is dominated by the selection of $X_{(p)}$ from the unordered set $\{X_i|H_0\}_N$. By letting q=N−p+1, $X_{(p)}$ is said to be the $q^{th}$ largest of N. The parameters {q,N} are thereby related directly to {p,N}. In that case, threshold selection may be done by requiring q(N−(q+1)/2) comparisons that include parsing $\{X_i|H_0\}_N$ and removing the maximum, repeated q times. There are infinitely many feasible parameter sets {q,N} satisfying (10) for given α or (12) for given {α,β}. Accordingly, in some embodiments set q=1 to minimize complexity (N−1 comparisons) and memory requirements (reference set cardinality). The memory requirement for a CAOS threshold may be found from (10) as:

$$N_C = \left\lceil \frac{1-\alpha}{\alpha} \right\rceil. \qquad (13)$$

For the TAOS threshold, the present invention recognizes that the critical choice of β=0.5 must be made to ensure the threshold is at or above the optimal level, $\gamma_\alpha$, half the time. By this choice it follows that the minimum TAOS memory requirement is then found from (12) with q=1 to be:

$$N_T = \left\lceil \frac{\log(0.5)}{\log(1-\alpha)} \right\rceil. \qquad (14)$$

$N_T$ is approximately 30% lower than $N_C$ for the same α. However, an OS threshold with $N_T$ reference statistics does not satisfy the CFAR constraint. This can be verified for a given α by recalling the earlier result of (9) that $P_F=\mu_c$ and evaluating (9) with p=$N_T$ to show $\mu_c>\alpha$. Therefore, the lower memory requirement of the TAOS threshold is achieved at the cost of a false alarm rate that is higher than the required level.

Some embodiments further maximize $P_D$ under the CFAR constraint with minimum complexity. The expression in (5) gives $P_D$ as the integral over the threshold's probability density function weighted by the complementary distribution of X|$H_1$. At SNR near unity, the mean and variance of the stochastic threshold, Γ, strongly influence $P_D$ because of the significant overlap between $f_Γ$(q) and the weighting function.

Figure 2A:
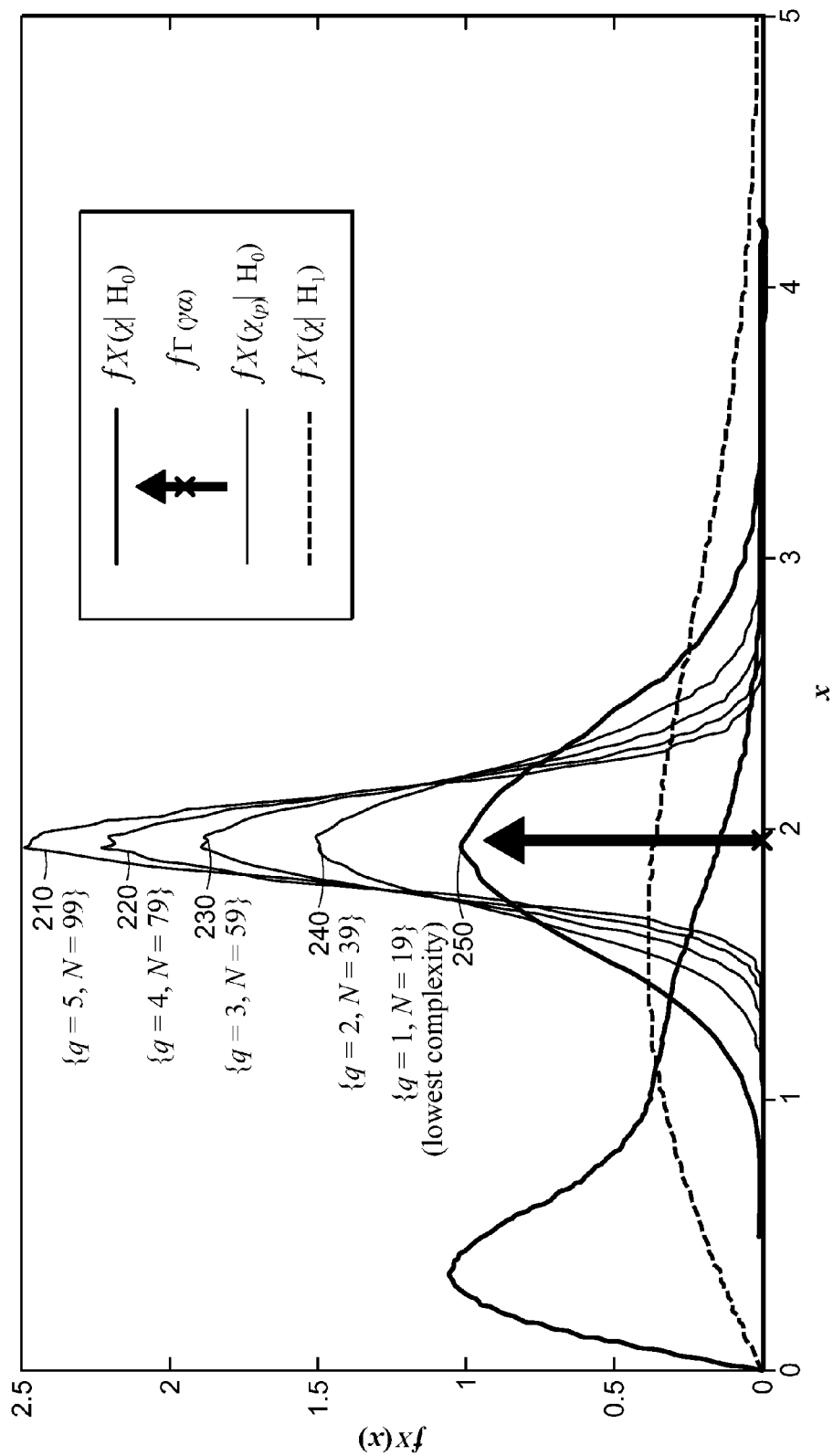
FIG. 2A includes plots of several order statistic threshold's distributions.

FIG. 2A illustrates the distributions of X|$H_0$ and X|$H_1$ and several CAOS thresholds that realize the same $P_F$ with different choices of {q,N}. Specifically, distributions having {q=5, N=99} 210, {q=4, N=79} 220, {q=3, N=59} 230, {q=2, N=39} 240, and {q=1, N=19} 250 are shown.

In the example shown in FIG. 2A, the signal and noise densities are set to $f_S(s) \sim \sqrt{0.5}N_C(2,1)$ and $f_W(\omega)=(4.5)^{1/2}$ [$f_{N_1}(n)+f_{N_2}(n)$], respectively, where $f_{N_1}(n) \sim N_C(0,1)$ and $f_{N_2}(n) \sim N_C(2,4)$ for $N_C(\mu,\sigma^2)$ denoting the density of a circularly symmetric complex Gaussian. The test statistic is X=Y| satisfies the requirement given in (2). The mean of Γ is constrained to achieve the prerequisite $P_F$. The variance remains a free parameter for maximizing $P_D$. The threshold of an OS density may be made to approximate the impulse density of the optimal threshold, $\gamma_\alpha$, by increasing {q,N} concurrently. The lowest complexity CAOS or TAOS thresholds (those where q=1) have large variance and are therefore expected to have significantly diminished $P_D$ at SNR near unity.

Figure 2B:
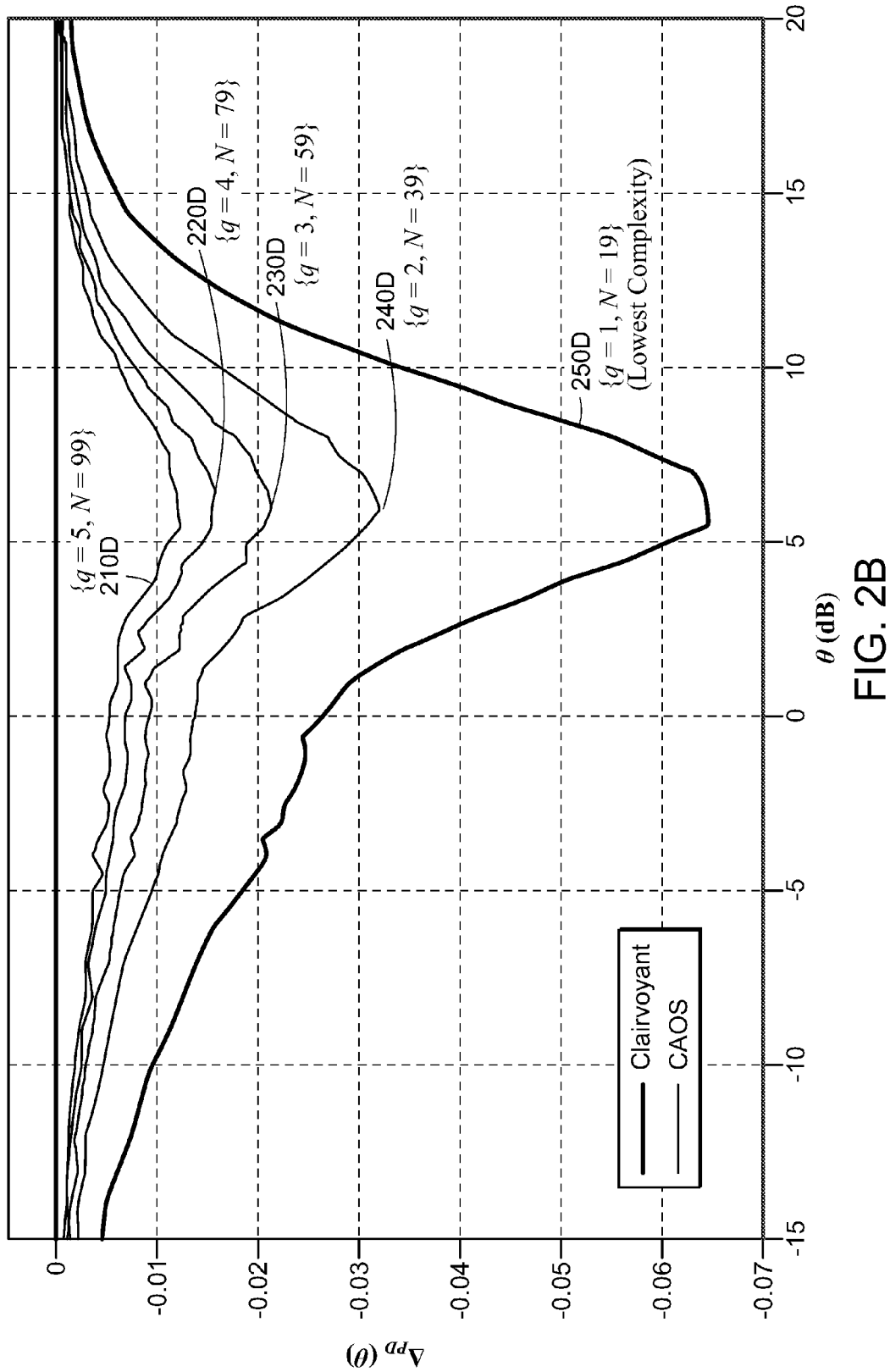
FIG. 2B illustrates the deviation of probability of detection from ideal for several order statistic threshold's distributions shown in FIG. 2A.

FIG. 2B illustrates $P_D$ deviation 210D-250D for the distributions 210-250 shown in FIG. 2A. The $P_D$ deviation is defined as $\Delta_{PD}(\theta)=P_D(\theta)-P_D^\alpha(\theta)$ where $P_D^\alpha(\theta)$ is the probability of detection achieved by the optimal threshold, $\gamma_\alpha$. The signal and noise densities used to generate FIG. 2B are the same as those used for FIG. 2A.

An Improved Threshold

Embodiments of the present invention obtain a threshold with improved error performance while retaining distribution-free CFAR behavior and lowest possible complexity by using the following result [9].

Result: Let the median of the $p^{th}$ order statistic of the unordered set $\{X_i\}_N$ be denoted $\tilde{X}_{(p)}$. Certain embodiments derive the threshold from $\tilde{X}_{(p)}$. Specifically, certain embodiments choose {p,N} for $\tilde{X}_{(p)}$ to satisfies equation (12) for prescribed {α,β=0.5}, because the probability $$Pr(X_i \geq \tilde{X}_{(p)}) \leq \alpha \qquad (15)$$

holds for all continuous distributions of $X_i$.

Proof: Let $Pr(X_i \geq \gamma_\alpha)=\alpha$. Let {p,N} satisfy (12) for {α,β=0.5}. Then equivalently from (7) and (11), $Pr(Pr(X_i \geq X_{(P)}) \leq \alpha) \geq 0.5$. This implies the event $Pr(X_i \geq X_{(P)}) \leq \alpha$ happens at least half the time. This same event is also the event $X_{(P)} \geq \gamma_\alpha$. Thus $Pr(X_{(P)} \geq \gamma_\alpha) \geq 0.5$ which, by definition of the median, implies $\tilde{X}_{(P)} \geq \gamma_\alpha$. It follows that $Pr(X_i \geq \tilde{X}_{(P)}) \leq \alpha$.

The median of an order statistic is distribution dependent and cannot be expressed in closed form. Certain embodiments form a distribution-free estimator of $\tilde{X}_{(p)}$ by selecting the median of M i.i.d. realizations of $X_{(p)}$. A threshold computed in such a fashion is hereinafter termed the MOME threshold. Certain embodiments of the MOME threshold, choose M≤7 and odd and choose whereby the threshold Γ=med$\{X_{(p)}\}_M$ is sufficiently close to $\tilde{X}_{(P)}$ to achieve $P_F \approx \alpha$. The MOME threshold has significantly lower variance than the TAOS and CAOS thresholds and is therefore able to achieve lower $P_D$ for the same SNR and $P_F$.

In certain embodiments, the requirements for computing med$\{X_{(p)}\}_M$ are M times greater than those for $X_{(p)}$. This factor may be reduced to unity in certain embodiments by reusing previously computed values of $X_{(p)}$. The cascaded arrangement of first-in first-out (FIFO) buffers shown in FIG. 1F realizes this savings. In certain embodiments, the newest element in $\{X_{(p)}\}_M$ is updated for the $i^{th}$ test with the current $X_{(p)}$ from $\{X_i\}_M$ Q. In certain embodiments, the oldest element of $\{X_{(p)}\}_M$ is replaced every $N^{th}$ null decision by $X_{(p)}$ from time i−1. This update scheme allows a MOME threshold to be realized in exactly (N−1)+⅜(M²−1) comparisons involving N+M−1 test statistics.

Figure 2C:
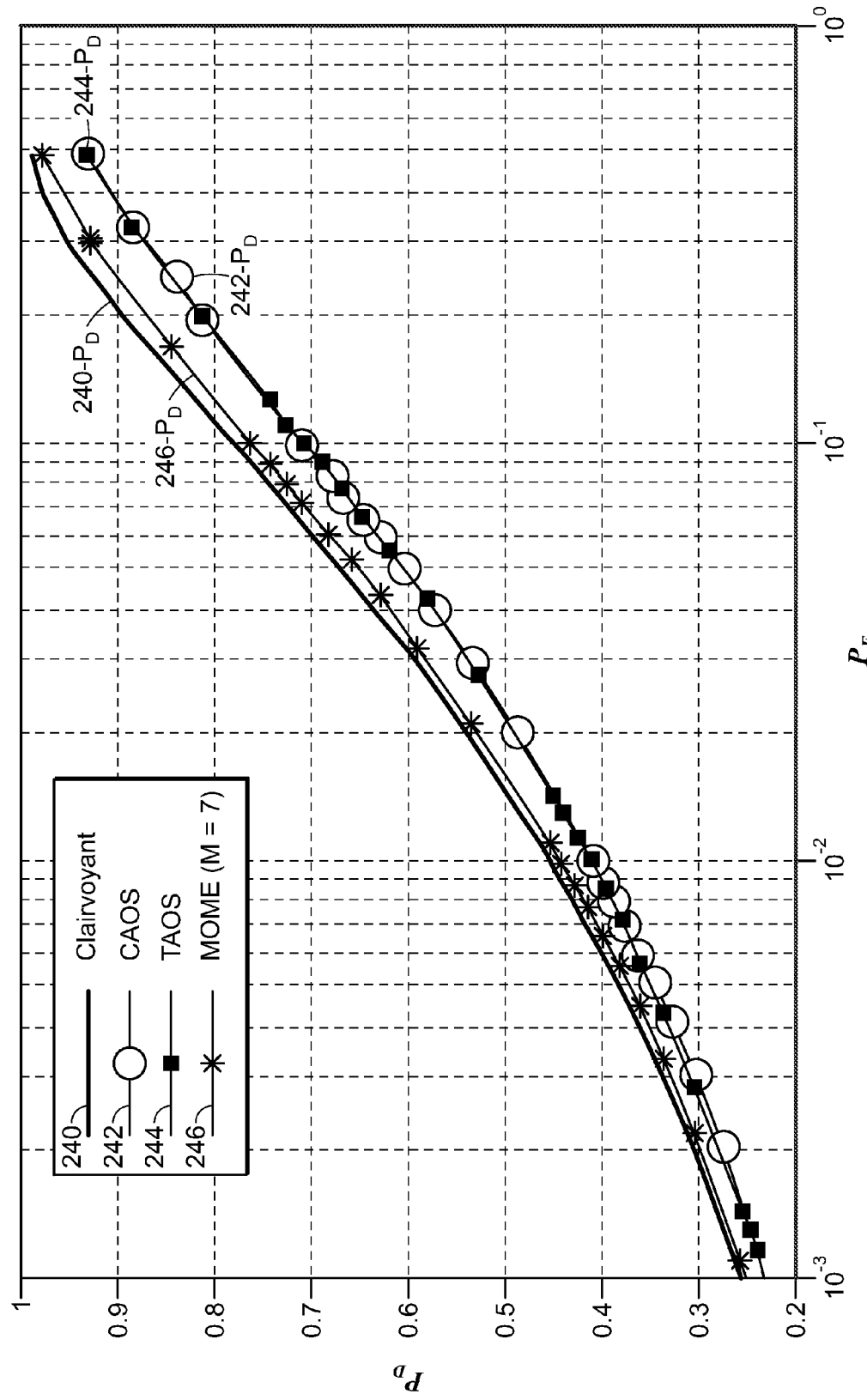
FIG. 2C illustrates the performance of various order statistics thresholds for for the same noise distribution and noise plus signal distribution used to generate FIG. 2A.

FIG. 2C is an illustration of comparison of the error performance of the lowest complexity (i.e. q=1) CAOS 242 and TAOS 244 thresholds with the MOME threshold 246 for the noise and signal distributions used to generate FIG. 2A. The discrete points on each curve are the operating points achieved when parameters are chosen according to (13) or (14) for values of α corresponding to values of $P_F$ demarked by the vertical grid lines of FIG. 2C. This comparison shows that the MOME threshold 246-$P_D$ has better error performance than the CADS threshold 242-$P_D$ and TAOS threshold 244-$P_D$ while having similar complexity to the TAOS threshold 244-$P_D$. In FIG. 2C, the CADS 242-$P_D$ and TAOS 244-$P_D$ curves are coincident but their discrete operating points (denoted by square and circle markers) are not coincident. The TAOS threshold 244-$P_D$ illustrates worse overall behavior because it achieves a $P_F$ significantly higher than the desired level α. The Clairvoyant threshold error curve 240-$P_D$ is the error performance of the optimal threshold, $\gamma_\alpha$. This curve 240-$P_D$ can only be achieved with clairvoyant knowledge of the unknown noise statistical distribution.

Figure 2D:
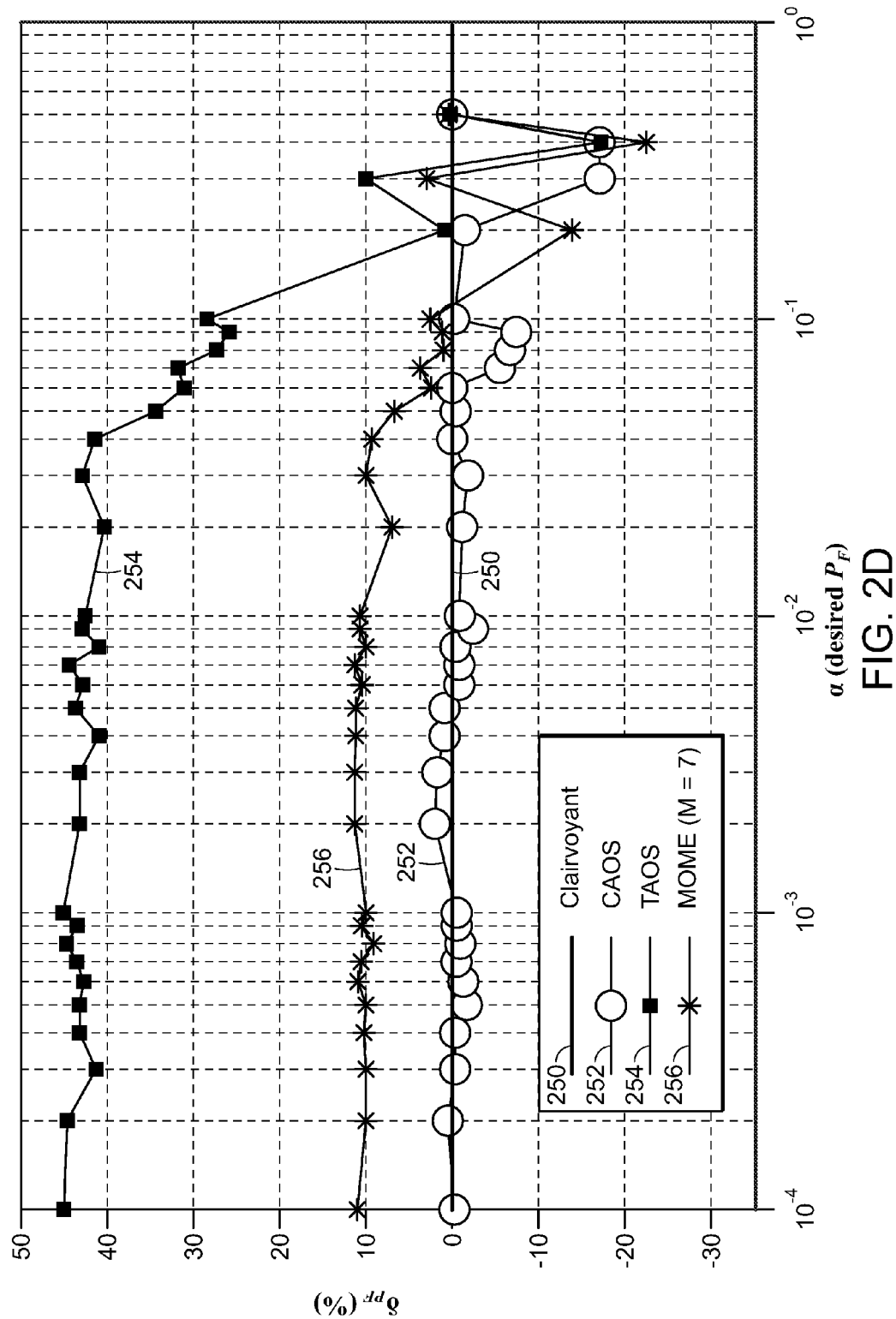
FIG. 2D illustrates the normalized deviation of probability of false alarm for the thresholds shown in FIG. 2C.

FIG. 2D illustrates the normalized deviation of each thresholds achieved probability of false alarm from the from ideal probability of false alarm, defined as $$\delta_{PF} = \frac{(P_F - \alpha)}{\alpha},$$

for the curves shown in FIG. 2C. As expected, the CADS threshold 252 operates at the required level. The MOME threshold 256 operates only slightly above the optimal level of 0. This is because the true median of $X_{(p)}$ cannot be computed for M<∞. Certain embodiments may circumvent this loss of performance by deriving the threshold using an element of the set $\{X_{(p)}\}_M$ other than the median element. The Clairvoyant threshold curve 250 is for the performance of the optimal threshold, $\gamma_\alpha$, and is always 0 by definition of $\delta_{PF}$.

Noise Extraction

Certain embodiments may extract noise reference statistics from prior test statistics. An extraction policy may be used to determine which test statistics become reference statistics using feedback from the threshold test.

Referring back to FIG. 1C, a decision state machine (DSM) 120 is used to execute the extraction policy. When detections are error-free, all test statistics for which the null hypothesis was accepted are extracted. When this policy is applied to detection with errors, then two types of extraction error may arise:

1. Contamination errors caused by extraction of test statistics corresponding to missed detections whereby the signal contaminates the noise Reference Buffer; and
2. Distortion errors caused by exclusion of test statistics causing false alarms whereby the tail of the noise density function is distorted because extreme noise observations are not included in the noise Reference Buffer.

In some embodiments, if the probability of an isolated false alarm is greater than the probability of an isolated detection then the following probability relation holds:

$$Pr([0\ 1\ 0]|[H_0 H_0 H_0]) \gg Pr([0\ 1\ 0]|[H_0 H_1 H_0]) \quad (16)$$

This is true for embodiments where the signals existence is transient and/or anomalous and/or a less likely event than it's absence. Embodiments of the present invention are not limited to the case of (16) and may use any probabilistic discriminator that describes the nature of the signal's existence and/or absence.

By (16), test statistics associated with isolated alarms are good candidates for extraction because they are unlikely to cause contamination errors and because they mitigate the occurrence distortion errors. Some embodiments may employ the following extraction policy:

| | |
|---|---|
| E* | If $[\delta_{i-2}\delta_{i-1}\delta_i]$ = [0 1 0] then $x_{i-1}$ replaces oldest in $\{X_i|H_0\}_N$ |
| E | If $\delta_i = 0$ then $x_i$ replaces oldest in $\{X_i|H_0\}_N$ |
| R | If $[\delta_{i-1}\delta_i]$ = [1 1] then reject $x_i$ |
| D | If $[\delta_{i-1}\delta_i]$ = [0 1] then defer $x_i$ until time i + 1 |

Policy lines are labeled by extraction state $\Omega \epsilon \{R,E,D\}$. In some embodiments, policy lines in the above policy are executed in the order listed. Embodiments of the present invention are not limited to encoding the test statistics using three binary digits and may use any representation, any number and any pattern/order thereof known in the art. Embodiments of the present invention are not limited to a policy for the handing of test statistics using the three actions (extract, defer, and reject).

Figure 3:
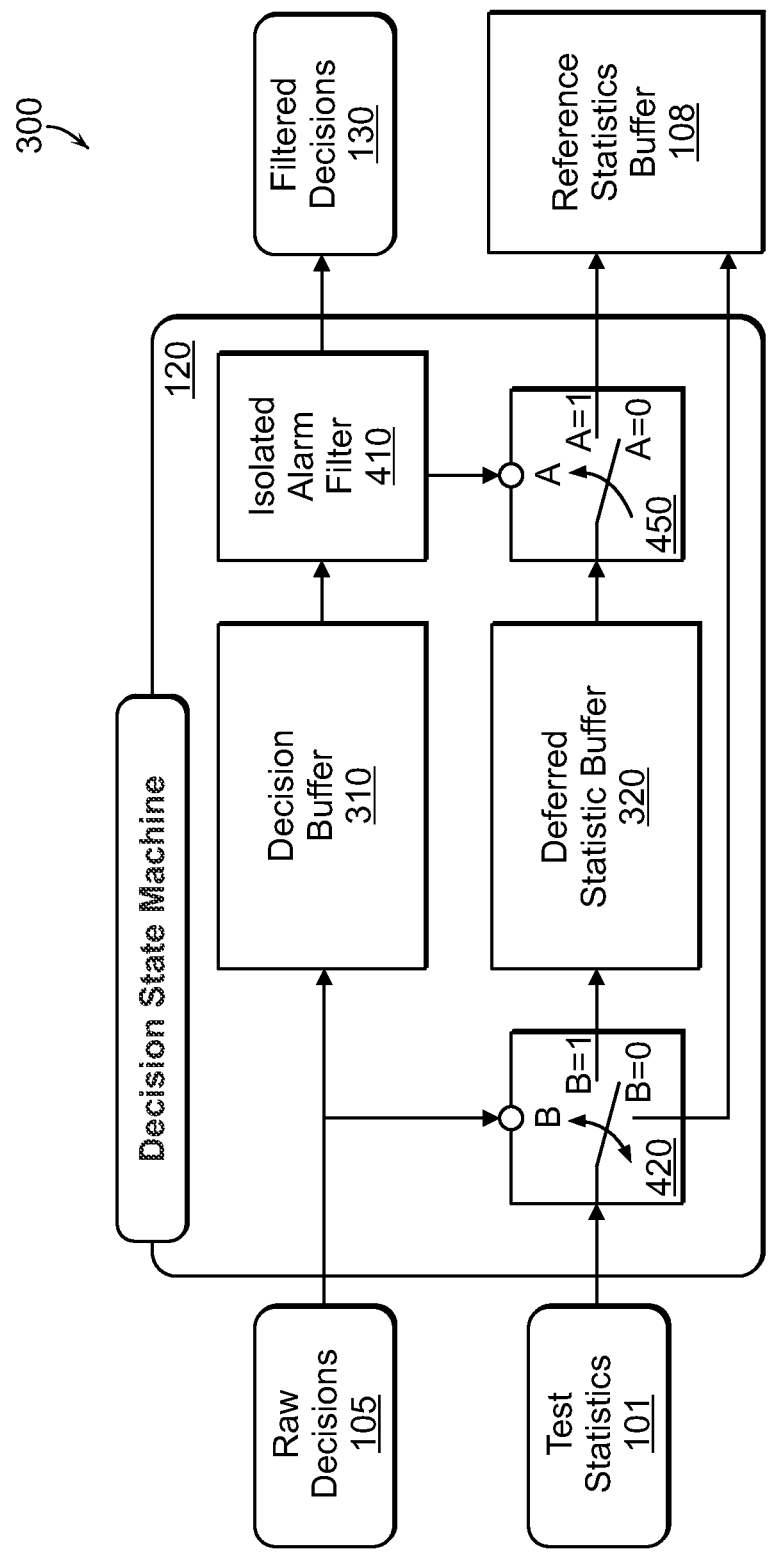
FIG. 3 is a block diagram of an embodiment of the decision state machine.

FIG. 3 illustrates an embodiment 300 of the decision state model 120 that may be responsible for adaptation of noise by decision directed noise extraction and decision filtering. In some embodiments, decisions forming a decision stream 105, as described with reference to FIGS. 1A-1D, are stored in a decision buffer 310 within the decision state machine 120. An Isolated Alarm Filter (IAF) 410 (described later in relation to FIG. 4) analyzes the decisions in the decision buffer to determine which test statistics (data) are good candidates for inclusion in the noise Reference Statistics Buffer and to determine which decisions are likely to be errors that should be corrected. Specifically, the IAF 410 may search for patterns of decisions that indicate the associated test statistics have high probability of being other than what the hypothesis test classified them to be. The IAF employs the extraction policy constraint of (16) and searches for an isolated alarm pattern, for example [0 1 0], and allows the test statistic associated with that alarm in that sequence to be released from its quarantine in the Deferred Statistic Buffer. The IAF further introduces the test statistic associated with that alarm into the noise Reference Statistic Buffer and corrects the alarm (described later in relation to decision filtering). The IAF 410 may further filter the decision stream 105 and output a filtered decision stream 130 from the decision state machine 120. Embodiments of the present invention are not limited to analyzing and/or filtering decisions using sets of three binary digits and may use any representation, any number and any pattern/order thereof known in the art.

In the above extraction policy, current, past, and future decisions may be employed by the decision state machine 120 to adaptively control the updates to the noise Reference Buffer. In certain embodiments, the IAF 310 may be coupled with a first 420 and a second 450 switch. The first switch 420 and the IAF 410 implement the E* line of the extraction policy outlined above. This line of the extraction policy mitigates distortion errors.

In the event that an alarm is generated, the associated test statistic may be more confidently re-classified as noise when the subsequent decision becomes available. For this reason, the test statistic associated with that alarm may be deferred until arrival the subsequent test statistic (line D of the extraction policy outlined above). Certain embodiments store such deferred test statistics in a buffer 320, namely the Deferred Statistic Buffer 320.

Figure 4:
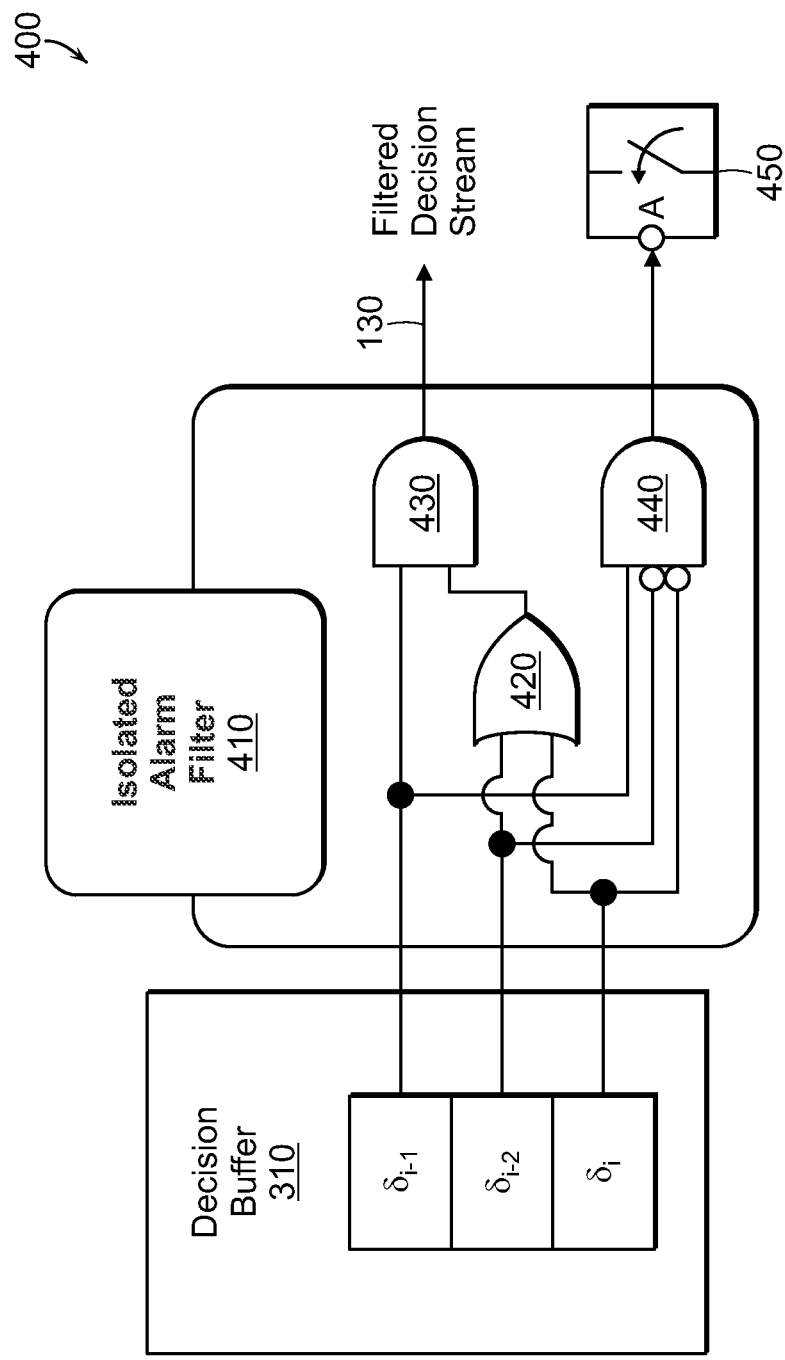
FIG. 4 illustrates a logic that implements a policy for noise extraction and decision filtering.

The second switch 450 implements lines E and D of the extraction policy outlined above. The logic of first switch 420 is executed before that of second switch 450 to keep reference statistics in chronological order. The test statistics classified as noise may be stored in a reference statistic buffer 108. In this example, the probability of distortion error is the at most $P(R)=\alpha^2$, which is very small. FIG. 4 is a block diagram 400 of the IAF 410 described earlier in relation to FIG. 3. A decision buffer, having decisions from a decision stream 105 feeds encoded values of decisions into an IAF 410. In this example, the decisions are encoded using three binary words 401, 402, 403 ($\delta_{i-1}$, $\delta_{i-2}$, $\delta_i$). However, embodiments of the invention are not limited to these three binary words and may use any type or combination of encoding known in the art. The IAF 410 includes an AND gate 440 as well as an OR gate 420 coupled with an AND gate 430.

Figure 5A:
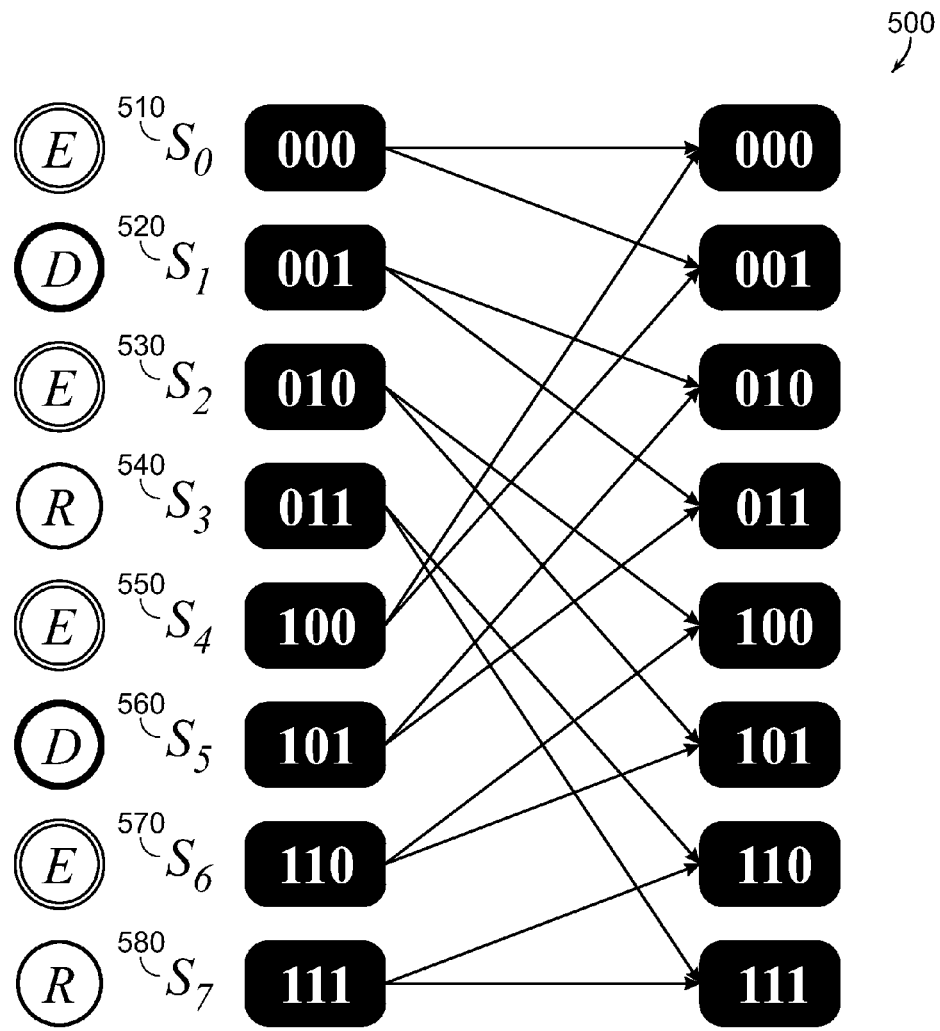
FIG. 5A is a block diagram of states and transitions of the decision state machine shown in FIG. 3.
Figure 5B:
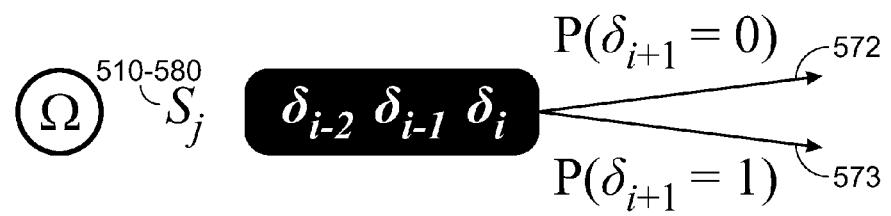
FIG. 5B is the legend for interpreting the labeling shown in FIG. 5A.

FIG. 5A is a diagram 500 of states and transitions of the decision state machine 120. The possible states of the decision buffer, denoted $\{S_0, \ldots S_7\}$ their transitions, and transition probabilities are also illustrated. Each trellis state $\{S_0, \ldots S_7\}$ is also labeled by its corresponding extraction state, $\Omega$. As shown in FIG. 5a, states $S_0$ 510, $S_2$ 530, $S_4$ 550, and $S_6$ 570 are classified under Rule E as noise. Decisions regarding states $S_1$ 520 and S 560 are deferred until a later time when additional test statistics are 25 available. States $S_3$ 540 and $S_7$ 580 are rejected outright as noise. The valid transitions from one state to its next possible states are indicated by arrows. The decision as to which of the possible transitions is selected depends on the outcome of the next decision as indicated by the key to the trellis shown in FIG. 5B. The upper transition 572 is taken when the next decision is no alarm and the lower transition 573 is taken when the next decision is an alarm. The probability of each possible transition 572, 573 may be assigned to each branch according to the branch labels in the key. For the purpose of analyzing the noise extraction policy, the analysis that follows assumes that there is only noise in the decision stream. Therefore, each branch probability in the trellis may be labeled as $\alpha$ (lower branches) or $1-\alpha$ (upper branches).

Figure 5C:
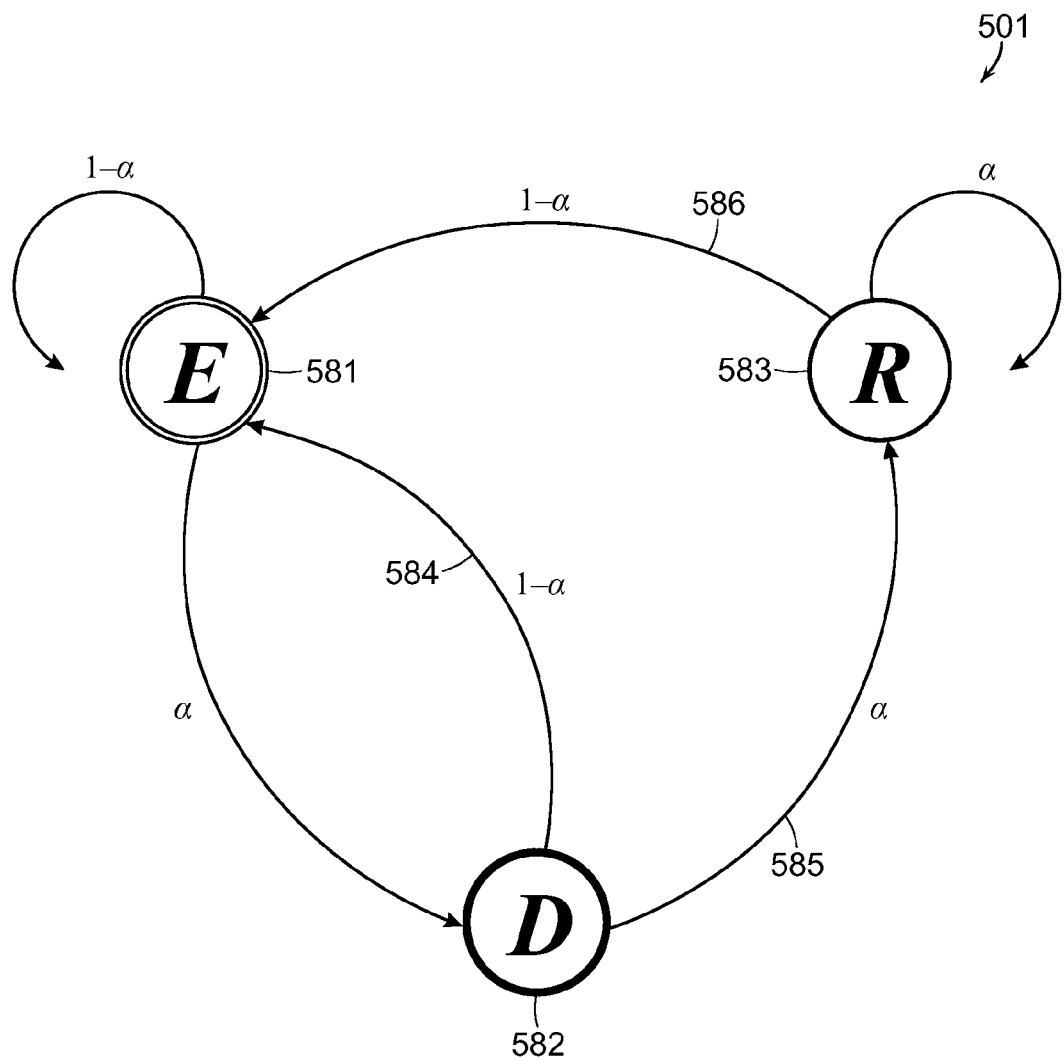
FIG. 5C is a representation of a Markov chain approximation of the noise extraction policy.

FIG. 5C is a representation 501 of an equivalent Markov chain that approximates the noise extraction policy under the scenario of pure noise in the data stream (test statistics). This chain is the arrangement of the eight decision states in the trellis of FIG. 5A, $\{S_0, \ldots, S_7\}$ into their extraction policy states, $\Omega$. Transitions between states E 581, D 582, and R 583 are shown. Transition probabilities between extraction policy states in the Markov Chain are computed as:

$$P(\Omega_k - \Omega_l) = \sum_{S_j \in \Omega_k} \left[ \frac{P(S_j)}{P(\Omega_k)} \sum_{S_h \in \Omega_l} P(S_j - S_h) \right] \quad (17)$$

and extraction state probabilities (the probability of being in one of the three states) are computed as $$P(\Omega_k) = \sum_{S_j \in \Omega_k} P(S_j). \quad (18)$$

FIG. 5C further illustrates the results of computing (17) for each possible transition by labeling the transition arrows with their associated transition probabilities as expressions involving $\alpha$. These transition probabilities are those realized under the scenario of pure noise in the data stream (test statistics). Specifically, the probability 584 of transitioning between a deferred decision 582 (Rule D) and a noise decision 581 (Rule E) is shown to be $1-\alpha$. Similarly the probability 585 of transition from a deferred state 582 (Rule D) and a rejected decision 583 (Rule R) is shown to be $\alpha$. Further, the probability of transitioning between a rejected state 583 (Rule R) and a noise decision 581 (Rule E) is shown to be $1-\alpha$. The probability of returning to state E from state E is $1-\alpha$ and the probability of returning to state R from state R is $\alpha$.

FIGS. 5D and 5E summarize the computation of (17) and (18). Specifically, the extraction state 587, decision state probability 588, and $P(S_j|\Omega_k)$ 589 for each decision state 510-580 are shown. FIG. 5E illustrates the probability of being in each extraction policy state 592 for the example case, where $\alpha=0.05$. In this example, only 0.25% of the noise-only tests statistics is classified as false alarms and rejected from inclusion in the noise Reference Statistics Buffer. This corresponds to a very small distortion error rate.

Figure 6:
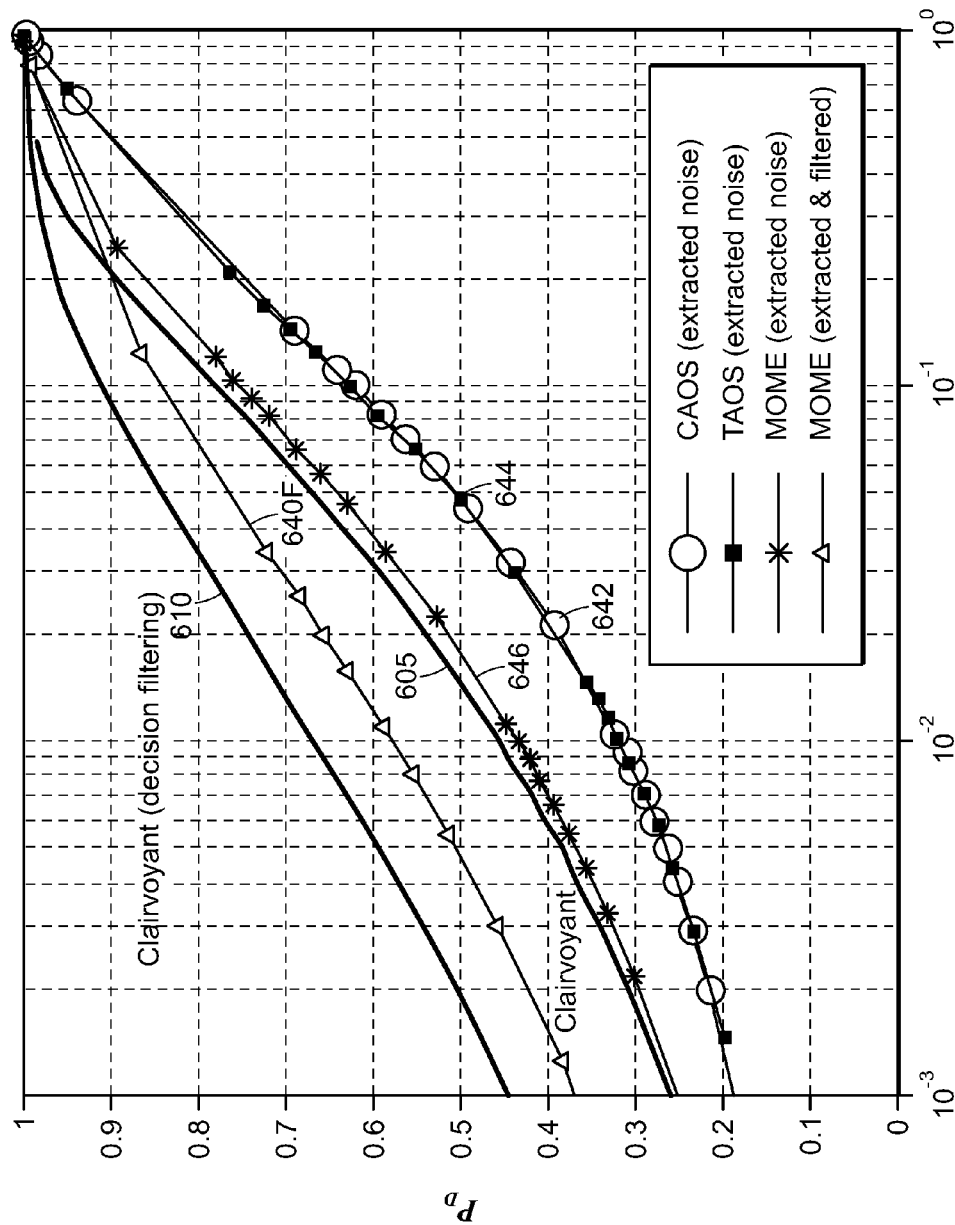
FIG. 6 illustrates the performance of various order statistics thresholds in combination with noise extraction and decision filtering for the same noise distribution and noise plus signal distribution used to generate FIG. 2A.

FIG. 6 includes a set of plots that illustrate detector performance with noise extraction. Threshold parameters, $\{q,N\}$, for the discrete points on each curve are the same used in FIG. 2C. The signal and noise densities used to generate FIG. 2C are used again for FIG. 6. The signal, when present, has a random onset and random duration lasting between 2 and 50 consecutive hypothesis tests. These curves are different from those shown in FIG. 2C. This is because the decision state machine and the noise extraction policy as described above are now used for FIG. 6 to populate each detector's noise Reference Buffer. Recall that for FIG. 2C, each detector's threshold computer was supplies with noise-only data from an undisclosed "genie" noise source. FIG. 6 shows the realistic scenario of a detector that adaptively generates its own noise model from the data available. Below $\alpha=0.01$, the achieved probability of false alarm using noise extraction is negligibly different from that achieved before with a genie noise source. However, the CAOS 642 and TAOS 644 thresholds have now significantly degraded $P_D$. The MOME 646 threshold maintains a near ideal performance (similar to that seen in FIG. 2C) because it is able to develop a longer-term memory of reference statistics in summary form (several maximums are retained) and because the median operation on these maximums gives both a lower variance (increased $P_D$) and is more robust to the effect of extraction errors.

Decision Filtering

As explained above, certain embodiments treat the decision sequence $[\delta_{i-2}\delta_{i-1}\delta_i]=[0\ 1\ 0]$ as an isolated false alarm. This is consistent with what is shown in (16), which alters the raw decision stream according to the mapping $[010] \rightarrow [000]$ and passes the resulting filtered decision stream as an optional output. This filtering function is implemented in the IAF using the logic circuit shown in FIG. 8 and incurs a latency of one test period. It may be shown from analysis of the noise extraction process as a Markov Chain that the filtered decision stream has nominal $P_F$ bounded as:

$$\phi > \alpha - [\alpha(1-\alpha)^2(1-\alpha) + \alpha^2(1-\alpha)(1-\alpha)] = \alpha^2(2-\alpha) \quad (19)$$

where the terms in brackets constitute the two ways of arriving at $S_2$. The right hand side of (19) can be thought of as the original probability of false alarm minus the probability contained in the two states that are eliminated because of filtering. The inequality exists because distortion errors still occur (with very low probability) during noise extraction and these cause the actual $P_F$ in the filtered decision stream to be slightly greater than . However, the bound becomes tight as a $\alpha \rightarrow 0$ (as is typically desired for a hypothesis test). The performance of the MOME threshold with noise extraction and decision filtering 646-D is shown in FIG. 6. Decision filtering is seen to reduce $P_D$ slightly and $P_F$ dramatically. The overall performance change is a significant improvement that comes at the expense of a small latency. The "Clairvoyant (decision filtering)" curve 610 is obtained by the combination of an optimal threshold, $\gamma_\alpha$, error-free noise extraction, and elimination of all isolated false alarms. The curve labeled 605 "Clairvoyant" in FIG. 6 is the curve achieved by the optimal threshold, $\gamma_\alpha$, and error-free noise extraction but not any isolated alarm filtering (i.e., Clairvoyant curve 240 shown in FIG. 2C).

Reduced Complexity

An alternative use of decision filtering, specifically Isolated Alarm Filtering 410, is to trade the improved performance seen in FIG. 6 for reduced complexity. The tradeoff between false alarm and complexity is captured by the following problem: what parameters, {q,N}, may allow an order statistic threshold to achieve a desired probability of false alarm, ø, if isolated filtering is used. The tradeoff is made by solving (19) for α and then substituting into (14) to get a new lower bound on the reference set cardinality. As (19) is a depressed cubic, its real roots can be found using transcendental functions. The root with support for both α and ø on the domain [0 1] gives $$\alpha < \frac{4}{3}\sin\left[\frac{1}{3}\mathrm{asin}\left(\frac{27}{16}\phi - 1\right)\right] + \frac{2}{3} \quad (20)$$

The reference set cardinality for a reduced complexity MOME threshold is then:

$$N_{RC} = \left\lceil \frac{\log(0.5)}{\log\left(\frac{1}{3} - \frac{4}{3}\sin\left[\frac{1}{3}\mathrm{asin}\left(\frac{27}{16}\phi - 1\right)\right]\right)} \right\rceil \quad (21)$$

where $N_{RC}$ is the number of test statistics needed in the noise Reference Buffer to achieve the false alarm rate of Ø at the output of the Decision State Machine 130 is used. The result in (21) is much smaller than the requirements for CAOS or TAOS thresholds to achieve a false alarm rate of Ø (ie. $N_{RC} \ll N_T < N_C$) as can be seen in comparison to (13) and (14). The performance of the reduced complexity instantiation of the MOME threshold with noise extraction and decision filtering is the curve 646-F in FIG. 6

Figure 7:
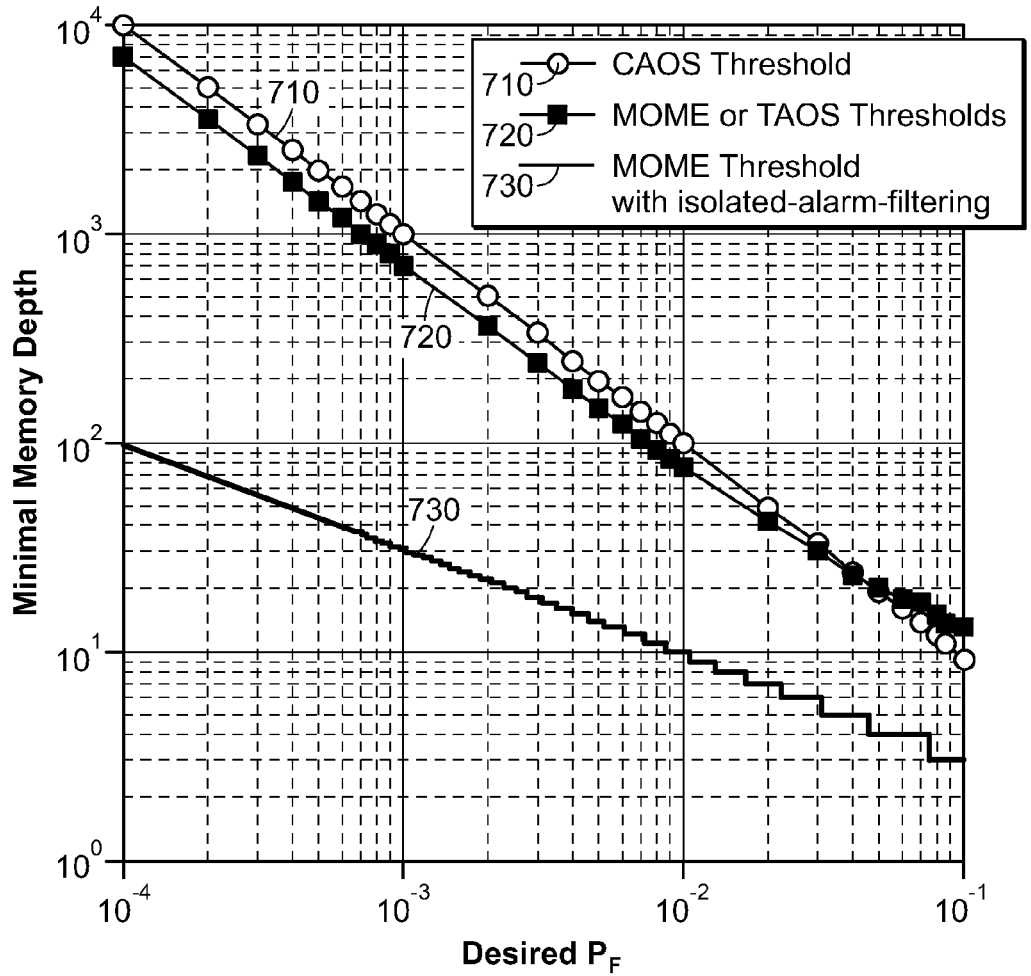
FIG. 7 illustrates the memory requirements needed by several order statistic thresholds for achieving some desired probability of false alarm.

FIG. 7 illustrates the memory requirements for TAOS, CAOS, MOME thresholds as well as the MOME threshold employing isolated alarm filtering to achieve reduced complexity. The CAOS curve 710 is computed from (13). The TAOS/MOME curve 720 is computed from (14). The MOME with IAF curve 730 is computed from (21). The vertical distance between curves indicates the difference in the complexities of the respective thresholds for a given desired $P_{FA}$.

The thresholding techniques of the present invention may be used in time-series detection problems, where very little a priori information is known about the noise and signal. The embodiments realize a low latency detector with a guaranteed probability of false alarm, best in-class probability of detection, and lowest complexity. Performance is governed by a closed form expression relating one parameter of the threshold to the desired probability of false alarm. To overcome the difficulties associated with typical sliding-window update technique, embodiments of the present invention employ a state-machine driven feedback path that selectively extracts the noise statistics required for setting a test threshold. The noise extraction function also provides a delayed (optional) decision output that that has significantly reduced error probability compared to the primary (immediate) decision. This improved performance can be traded for further reduction in complexity. Further, the present invention provides a closed form expression that relates the probability of false alarm at the secondary output to the one tunable parameter of the threshold.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be loaded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

References, the entire teachings of which are incorporated herein by reference.

[1] A. Sarma and D. W. Tufts, "Robust Adaptive Threshold for Control of False Alarms", IEEE Signal Processing Letters, Vol. 8, No. 9, pp. 261-263, September 2001.

[2] A. M. Zoubir, R. F. Brcich, "Tolerance Intervals for Accuracy Control of Bootstrapped Matched Filters," IEEE Signal Processing Letters, Vol. 9, No. 8, pp. 247-250, August 2002.

[3] S. S. Wilks, "Determination of Sample Sizes for Setting Tolerance Limits", The Annals of Mathematical Statistics, Vol. 12, No. 1, pp. 91-96, March 1941.

[4] H. A. David, "Order Statistics", Wiley, 1981.

[5] I. Guttman, "Statistical Tolerance Regions: Classical and Bayesian", Griffin, London, 1970.

[6] A. Sonnenschein and P. Fishman, "Radiometric Detection of Spread Spectrum Signals in Noise of Uncertain Power," IEEE Tran. on Aerospace and Electronic Sys., Vol. 28, No. 3, pp. 654-660, July 1992.

[7] H. Urkowitz, "Energy Detection of Unknown Deterministic Signals," Proceedings of the IEEE, Vol. 55, No. 4, pp. 523-531, April 1967.

[8] P. P. Gandhi and S. A. Kassam, "Analysis of CFAR processors in nonhomogeneous background," IEEE Trans. on Aerospace and Electronic Sys. Vol. 24, No. 4, July 1988.

[9] D. W. Browne, "Detection of Unknown Signals in Unknown, Non-Stationary Noise," Proceedings of the Asilomar Conference on Signals, Systems, and Communications, November 2009.

[10] E. C. Real and D. W. Tufts, "Estimation of Prescribed False Alarm Rate Thresholds from Local Data Using Tolerance Intervals", IEEE Signal Processing Letters, Vol. 6, No. 1, January 1999.

What is claimed is:

1. A method for hypothesis testing comprising, in a data processor:
   receiving a data stream;
   determining a decision stream based on the data stream compared to a threshold;
   determining a noise subset of the data stream based on the decision stream; and
   generating the threshold from the noise subset of the data stream based on an order statistics processing of the noise subset.

2. The method of claim 1 wherein the noise subset is determined based on a pattern of recent decisions in the decision stream.

3. The method of claim 2 further comprising modifying the decision stream based on the pattern of recent decisions.

4. The method of claim 3 wherein generating the threshold includes identifying a maximum element from each of plural portions of the noise subset and selecting one of the identified maximum elements to generate the threshold.

5. The method of claim 4 wherein generating the threshold further comprises obtaining the threshold based on a median value of the identified maximum values.

6. The method of claim 1 wherein generating the threshold includes identifying a maximum element from each of plural portions of the noise subset and selecting one of the identified maximum elements to generate the threshold.

7. The method of claim 6 wherein generating the threshold further comprises obtaining the threshold based on a median value of the identified maximum values.

8. The method of claim 1 wherein generating the threshold comprises selecting an element of the noise subset.

9. The method of claim 1 wherein the data processor is at least one of a field-programmable gate array circuit, a digital signal processor, an application specific integrated circuit, a graphics processing unit, and a central processing unit.

10. The method of claim 1 further including adaptively updating the threshold to achieve a constant probability of false alarm.

11. The method of claim 1 further including determining the threshold based on a user-prescribed probability of error in the decision stream.

12. The method of claim 1 wherein power of the data stream is compared to the threshold.

13. The method of claim 1 further including processing the decision stream using a decision logic by filtering decision stream samples having a higher probability of false alarms.

14. The method of claim 1 further including determining the decision stream by multi-hypothesis testing of the data stream compared to multiple thresholds.

15. A method for hypothesis testing comprising, in a data processor:
receiving a data stream;
determining a decision stream based on the data stream compared to a threshold;
determining a noise subset of the data stream based on a pattern of decisions in the decision stream, and
determining the threshold from the noise subset.

16. The method of claim 15 further comprising modifying the decision stream based on the pattern of recent decisions.

17. The method of claim 15 wherein generating the threshold includes identifying a maximum element from each of plural portions of the noise subset and selecting one of the identified maximum elements to generate the threshold.

18. The method of claim 17 wherein generating the threshold further comprises obtaining the threshold based on a median value of the identified maximum values.

19. A method for hypothesis testing comprising, in a data processor:
receiving a data stream;
determining a decision stream based on the data stream compared to a threshold;
determining a noise subset of the data stream based on the decision stream;
generating the threshold from the noise subset of the data stream; and
modifying the decision stream based on whether data of the data stream is determined to be in the noise subset of the data stream.

20. A method for hypothesis testing comprising, in a data processor:
receiving a data stream;
determining a decision stream based on the data stream compared to a threshold; and
modifying the decision stream based on a pattern of recent decisions in the decision stream.

21. A method for hypothesis testing comprising, in a data processor:
receiving a data stream;
determining a noise subset of the data stream;
identifying a maximum element from each of plural portions of the noise subset;
selecting one of the identified maximum elements to generate a threshold; and
obtaining a decision stream based on the data stream compared to the threshold.

22. The method of claim 21 wherein generating the threshold further comprises obtaining the threshold based on a median value of the identified maximum values.

23. An apparatus for hypothesis testing comprising:
an input that receives a data stream;
a comparator that determines a decision stream based on the data stream compared to a threshold;
a filter that determines a noise subset of the data stream based on the decision stream; and
a threshold calculator that generates the threshold from the noise subset of the data stream based on an order statistics processing of the noise subset.

24. The apparatus of claim 23 wherein the filter is arranged to determine the noise subset based on a pattern of recent decisions in the decision stream.

25. The apparatus of claim 24 wherein the filter modifies the decision stream based on the pattern of recent decisions.

26. The apparatus of claim 25 wherein the threshold calculator is arranged to generate the threshold by identifying a maximum element from each of plural portions of the noise subset and selecting one of the identified maximum elements to generate the threshold.

27. The apparatus of claim 26 wherein the threshold calculator is further arranged to generate the threshold by obtaining the threshold based on a median value of the identified maximum values.

28. The apparatus of claim 23 wherein the threshold calculator is arranged to generate the threshold by identifying a maximum element from each of plural portions of the noise subset and selecting one of the identified maximum elements to generate the threshold.

29. The apparatus of claim 28 wherein the threshold calculator is further arranged to generate the threshold by obtaining the threshold based on a median value of the identified maximum values.

30. The apparatus of claim 23 wherein the threshold calculator is arranged to generate the threshold by selecting an element of the noise subset.

31. The apparatus of claim 23 wherein the apparatus comprises at least one of a field-programmable gate array circuit, a digital signal processor, an application specific integrated circuit, a graphics processing unit, and a central processing unit.

32. The apparatus of claim 23 wherein the threshold calculator is arranged to adaptively update the threshold to achieve a constant probability of false alarm.

33. The apparatus of claim 23 wherein the threshold calculator is arranged to generate the threshold based on a user-prescribed probability of error in the decision stream.

34. The apparatus of claim 23 wherein power of the data stream is compared to the threshold.

35. The apparatus of claim 23 wherein the comparator is arranged to process the decision stream using a decision logic by filtering decision stream samples having a higher probability of false alarms.

36. The apparatus of claim 23 wherein the comparator obtains the decision stream by multi-hypothesis testing of the data stream compared to multiple thresholds.

37. An apparatus for hypothesis testing comprising:
  an input that receives a data stream;
  a comparator that determines a decision stream based on the data stream compared to a threshold;
  a filter that determines a noise subset of the data stream based on a pattern of decision in the decision stream, and
  a threshold calculator that determines the threshold from the noise subset.

38. The apparatus of claim 37 wherein the filter is arranged to modify the decision stream based on the pattern of recent decisions.

39. The apparatus of claim 37 wherein the threshold calculator determines the threshold by identifying a maximum element from each of plural portions of the noise subset and selecting one of the identified maximum elements to generate the threshold.

40. The apparatus of claim 37 wherein the threshold calculator determines the threshold based on a median value of the identified maximum values.

41. An apparatus for hypothesis testing comprising, in a data processor:
  An input that receives a data stream;
  a comparator that determines a decision stream based on the data stream compared to a threshold;
  a filter that determines a noise subset of the data stream based on the decision stream and modifies the decision stream based on whether data of the data stream is determined to be in the noise subset of the data stream; and
  a threshold calculator that generates the threshold from the noise subset of the data stream.

42. An apparatus for hypothesis testing comprising, in a data processor:
  an input that receives a data stream;
  a comparator that determines a decision stream based on the data stream compared to a threshold; and
  a filter that modifies the decision stream based on a pattern of recent decisions in the decision stream.

43. An apparatus for hypothesis testing comprising, in a data processor:
  an input that receives a data stream;
  a filter that determines a noise subset of the data stream;
  an identifier that identifies a maximum element from each of plural portions of the noise subset;
  a threshold calculator that selects one of the identified maximum elements to generate a threshold; and
  a comparator that obtains a decision stream based on the data stream compared to the threshold.

44. The apparatus of claim 43 wherein threshold calculator is arranged to obtain the threshold based on a median value of the identified maximum values.

\* \* \* \* \*